US006985329B2

(12) United States Patent
Niitsuma et al.

(10) Patent No.: US 6,985,329 B2
(45) Date of Patent: Jan. 10, 2006

(54) MAGNETIC DISK CARTRIDGE

(75) Inventors: Kazuhiro Niitsuma, Kanagawa-ken (JP); Ryosuke Ogura, Kanagawa-ken (JP); Kazuo Hiraguchi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 41 days.

(21) Appl. No.: 10/266,576

(22) Filed: Oct. 9, 2002

(65) Prior Publication Data

US 2003/0067715 A1 Apr. 10, 2003

(30) Foreign Application Priority Data

| | | | |
|---|---|---|---|
| Oct. 10, 2001 | (JP) | ............................. | 2001-312865 |
| Dec. 10, 2001 | (JP) | ............................. | 2001-375863 |
| Feb. 19, 2002 | (JP) | ............................. | 2002-041664 |
| Mar. 1, 2002 | (JP) | ............................. | 2002-055664 |
| Mar. 27, 2002 | (JP) | ............................. | 2002-087377 |

(51) Int. Cl.
*G11B 17/08* (2006.01)

(52) U.S. Cl. .............................. 360/98.04; 360/98.06; 360/99.06

(58) Field of Classification Search .. 360/98.04–98.06, 360/99.06–99.07
See application file for complete search history.

(56) References Cited

U.S. PATENT DOCUMENTS

| | | | | |
|---|---|---|---|---|
| 3,800,325 | A * | 3/1974 | O'Brien .................. | 360/97.03 |
| 4,368,495 | A * | 1/1983 | Hamanaka et al. ...... | 360/99.06 |
| 4,553,175 | A | 11/1985 | Baumeister | |
| 6,028,737 | A * | 2/2000 | Khuu ...................... | 360/99.06 |
| 6,081,410 | A | 6/2000 | Batarseh et al. | |
| 6,157,514 | A * | 12/2000 | Larsen et al. ............ | 360/99.06 |

* cited by examiner

*Primary Examiner*—A. J. Heinz
(74) *Attorney, Agent, or Firm*—Sughrue Mion, PLLC

(57) ABSTRACT

A magnetic disk cartridge for use in a disk drive having both a slot and a guide portion. The magnetic disk cartridge comprises a generally disk-shaped housing in which a magnetic disk is rotatably housed, and protrusions. The protrusions are formed on the main surface of the housing and are used for positioning the magnetic disk cartridge in a direction capable of recording and reproduction in cooperation with the guide portion of the disk drive when the magnetic disk cartridge is loaded in the disk drive.

10 Claims, 30 Drawing Sheets

FIG.18A
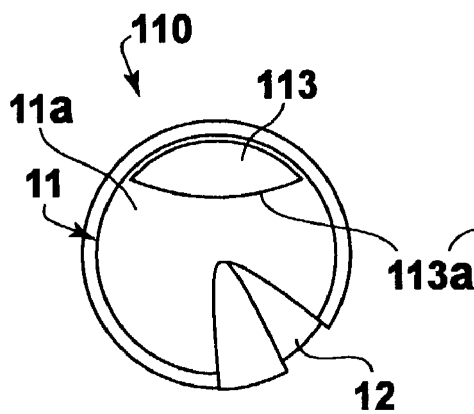
FIG.18B
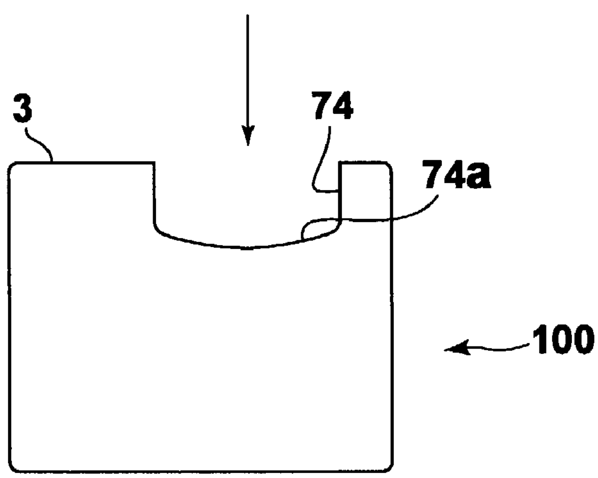
FIG.18C

FIG.19A
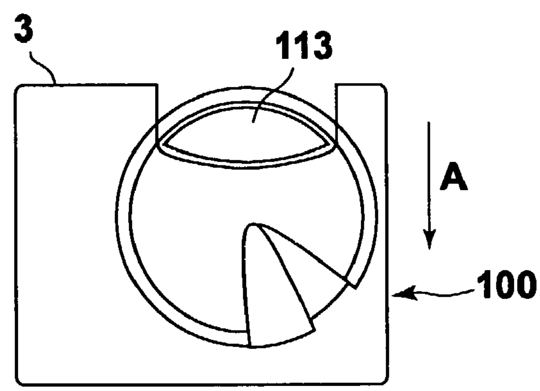
FIG.19C
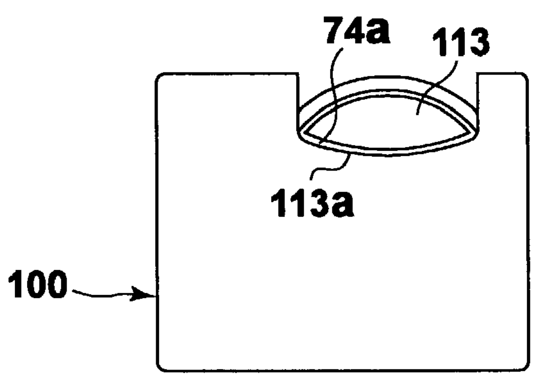
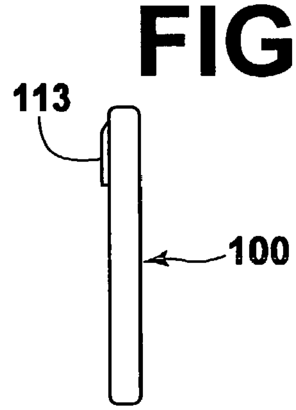
FIG.19B

MAGNETIC DISK CARTRIDGE

BACKGROUND OF THE INVENTION

1. Field of the Invention

The present invention relates generally to a magnetic disk cartridge, and more particularly to a small magnetic disk cartridge that is inserted and loaded in a disk drive provided in small electronic equipment such as a digital camera, a laptop computer, etc.

2. Description of the Related Art

To record or reproduce information, a recording medium is removably inserted in the card slot of electronic equipment such as a digital still camera, a digital video camera, a laptop computer, etc. Such recording media in practical use are of a semiconductor memory type, a hard disk type, an optical disk type, a magnetic disk type (e.g., a floppy disk type), etc.

Among these recording media, semiconductor memories are most widely used because they are easy to handle and have a relatively large recording capacity. However, they are relatively expensive. Because of this, in digital cameras employing the semiconductor memory, the photographed image data is transferred to a PC and stored, the data is deleted from the memory, and the semiconductor memory is repeatedly used.

Hard disks are similarly expensive, although some of them can store 340 megabytes (MB) of data or 1 gigabytes (GB) of data. Because of this, data is transferred to another device and stored, and hard disks are repeatedly used.

Optical disks have a large recording capacity for their size. For example, an optical disk with a size of 35 mm×41 mm×11 mm can store 260 MB of data. Optical disks with a recording capacity of 512 MB are about to be realized. However, optical disks have the disadvantage that the recording speed is slow, because their writing time is time-consuming.

Some magnetic disks such as a floppy disk have a small size of 50 mm×55 mm×2 mm. Such a small magnetic disk can be exchangeably loaded in a disk drive of a size that can be inserted into the card slot of a PC, etc. However, the recording capacity is as small as 40 MB and insufficient to record image data photographed by a camera. In addition, the size is not suitable for digital cameras.

With the spread of PCs, digital cameras have spread rapidly in recent years because of the simplicity of recording, enhancement in picture quality due to the development of imaging elements, possibility of data deletion and transmission, recording capacity size, etc. However, the method of use is restricted, because recording media are limited in cost and recording capacity, as described above. For instance, since recording media are very expensive, a single camera has only a single recording medium, which is repeatedly used. That is, when the recording medium is filled with data, the data is transferred to a PC and deleted. Because of this, there are cases where the recording medium is filled up during a trip. In such a case, the recording medium cannot be stored along with data and cannot be given away to a person.

The realization of a recording medium which is large in recording capacity, low in cost, and small in size so that the data photographed by a digital camera can be stored or given away to a person is desired. With regard to PCs as well, the realization of a recording medium which is large in recording capacity, low in cost, and small in size so that data can be stored thereon and handed to a person is desired.

To meet the aforementioned demands, it is contemplated that the above-described inexpensive small large-capacity recording medium may comprise a card-type disk drive which is loaded in electronic equipment such as a PC and a digital camera, and a magnetic disk cartridge which is loaded in the card-type disk drive. That is, it is contemplated that such a magnetic disk cartridge may include a housing in which a flexible magnetic disk is rotatably housed, and have a recording capacity of 200 MB or larger. Examples of high density magnetic recording media are a recording medium with a thin metal film formed by vapor deposition, a recording medium with a thin metal film formed by sputtering, and a recording medium employing barium ferrite powder or ferromagnetic magnetic powder. An example of a high density magnetic recording medium employing barium ferrite powder is disclosed in Japanese Patent Application No. 2001-312864.

The "high density magnetic recording medium employing barium ferrite powder" is a magnetic disk containing barium ferrite powder in a magnetic layer, and employs a material capable of high-recording density. The magnetic disk may comprise a magnetic recording medium disclosed in, for example, Japanese Patent Application No. 2001-205290. The magnetic recording medium has a non-magnetic layer which includes both non-magnetic powder and a binder, and a magnetic layer which includes both ferromagnetic powder (which is ferromagnetic metal powder or hexagonal-system ferrite powder) and a binder on at least one surface of a nonmagnetic substrate. The non-magnetic layer and the magnetic layer are formed on at least one side of a non-magnetic supporting body in the recited order. In the non-magnetic layer, the quantity of carbon black whose average particle diameter is 10 to 30 nm is 10 to 50 weight parts with respect to 100 weight parts of the aforementioned non-magnetic powder. The thickness of the magnetic layer is 0.2 $\mu$m or less. According to a microanalysis by an electron beam, the standard deviation (b) of the strength of an element with respect to an average strength (a) resulting from ferromagnetic powder is $0.03 \leqq b/a \leqq 0.4$. The center plane average roughness Ra of the magnetic layer is 5 nm or less, and the 10-point average roughness Rz is 40 nm or less. In a magnetic disk employing the above-described material, information is recorded or reproduced by a magnetic head such as an MR head capable of high-recording density.

The above-described magnetic recording medium can have a recording capacity of 200 MB or larger, preferably 500 MB or larger. Therefore, if a still image has 1 MB of data per sheet, the magnetic recording medium can store 500 sheets. In the case of a dynamic image, the magnetic recording medium can store image contents of about 30 minutes. Thus, the magnetic recording medium can store a dynamic image photographed by a digital camera, and a dynamic image transmitted by a portable telephone. As a result, users can conveniently use the magnetic recording medium. Furthermore, the magnetic recording medium can be conveniently used in PCs as an inexpensive large-capacity recording medium. Thus, the convenience is great.

Preferred examples of disk drives in the present specification include disk drives incorporated in PCs, digital cameras, etc., as well as other types of disk drives. In the case of PCs, there are a disk drive 1' shown in FIG. 32A, and disk drives incorporated in a PC card, such as "click!" (registered trademark). The disk drive 1' is connected electrically with a socket 7 of the receiving portion of a card 6 that is inserted in a PC card slot provided in a PC. In the case of a digital camera 8, as shown in FIG. 32B, there is a small disk drive 1' that is connected electrically with the socket of the receiving portion 9 of the camera 8. Therefore, the small disk drive 1' is extremely small in size and has, for example, a length of 38 to 55 mm, a width of 35 to 51 mm, and a thickness of 3 to 5 mm. A magnetic disk cartridge 10' has, for example, a length and a width of 25 to 36 mm and a thickness of 1 to 3 mm.

Incidentally, it has been proposed that the housing of such a subminiature magnetic disk cartridge is formed into the shape of a disk so that the magnetic recording medium can be handled like a coin. That is, if the magnetic recording medium can be handled with the same ease that a coin is inserted into the slot of a vending machine, the convenience can be enhanced.

In such a type of magnetic recording medium, the magnetic disk is provided in a housing and protected, as with conventional floppy disks. When the magnetic recording medium is loaded in a small disk drive, and information is recorded or reproduced, a shutter provided in the housing is moved so that the magnetic disk is exposed, thereby providing access thereto.

Even in the case of the housing formed into the shape of a disk, it is necessary to insert the housing in a predetermined direction so that information can be recorded or reproduced. If the housing is formed into the shape of a disk, however, the housing can be inserted into a disk drive regardless of the position of the shutter, because it has no directionality. That is, there is a possibility that the magnetic disk cartridge will be inserted into a disk drive in a direction where information recording and reproduction cannot be performed.

SUMMARY OF THE INVENTION

The present invention has been made in view of the above-described circumstances. Accordingly, it is the primary object of the present invention to provide a magnetic disk cartridge that can be loaded in a disk drive in a direction where information recording and reproduction can be performed, even when the housing is formed into the shape of a disk.

To achieve this end and in accordance with the present invention, there is provided a first magnetic disk cartridge for use in a disk drive having both a slot and a guide portion. The magnetic disk cartridge comprises a generally disk-shaped housing in which a magnetic disk is rotatably housed, and protrusions. The protrusions are formed on a main surface of the housing and are used for positioning the magnetic disk cartridge in a direction capable of recording and reproduction in cooperation with the guide portion of the disk drive when the magnetic disk cartridge is loaded in the disk drive.

In the first magnetic disk cartridge of the present invention, it is preferable that the aforementioned housing comprise at least one opening into which a magnetic head of the disk drive is inserted, and at least one shutter for opening or closing the opening.

It is preferable that the aforementioned protrusions comprise at least two protrusions disposed along a straight line passing through the center of the main surface of the housing, and across the center.

It is further preferable that the aforementioned protrusions also comprise first and second protrusions disposed along a straight line passing through the center of the main surface of the housing, and across the center. The distance of the first protrusion from the center may be different from that of the second protrusion.

In the magnetic disk cartridge of the present invention, the height of the first protrusion from the main surface of the housing maybe substantially equal to that of the second protrusion The height of the first protrusion from the main surface of the housing may also be different from that of the second protrusion.

In the magnetic disk cartridge of the present invention, in the case that the heights of the protrusions differ, it is preferable that the first protrusion is disposed at a position close to the center. The second protrusion may be disposed at a position farther away from the center. It is preferable that the height of the first protrusion may be lower than that of the second protrusion.

The aforementioned housing may be equipped with a plurality of openings each having a shutter. In this case, the protrusions are used to locate any one of a plurality of openings at a position capable of recording and reproduction in cooperation with the guide portion of the disk drive when the magnetic disk cartridge is loaded in the disk drive.

In the magnetic disk cartridge of the present invention, the aforementioned housing may have on its side face a pair of openings that have the shutter and are symmetrical with respect to the center of the main surface of the housing. The housing may also have cutouts that communicate with the openings and are formed in the main surface. The protrusions may be provided to cover the cutouts.

The "main surface of the housing" refers to one of the top and bottom surfaces of a generally disk-shaped housing. It is necessary that the aforementioned protrusion protrude from the main surface. The protrusion has a height such that it is guided to the guide portion of the disk drive or abuts the guide portion. The protrusions may be formed integrally with the housing. Alternatively, they may be separate members. The separate protrusions may be fixed on the main surface by an adhesive, etc. The protrusions may be normally housed in the housing, if they protrude when the magnetic disk cartridge is loaded in a disk drive.

Further in accordance with the present invention, there is provided a second magnetic disk cartridge for use in a disk drive having both a slot and a protruding portion. The second magnetic disk cartridge comprises a generally disk-shaped housing in which a magnetic disk is rotatably housed, and a guide groove for positioning the magnetic disk cartridge in a direction capable of recording and reproduction in cooperation with the protruding portion provided within the slot of the disk drive when the magnetic disk cartridge is loaded in the disk drive.

In the second magnetic disk cartridge of the present invention, it is preferable that the guide groove is formed in a main surface of the housing along a straight line passing through the center of the main surface. It is also preferable that the guide groove has a broad portion which widens toward the outer circumference of the main surface.

In the first and second magnetic disk cartridges of the present invention, the magnetic disk may comprise a high density magnetic recording medium employing barium ferrite powder.

In accordance with the first magnetic disk cartridge, protrusions are provided on the main housing of the housing to position the magnetic disk cartridge in a direction capable of recording and reproduction in cooperation with the guide portion of the disk drive when the magnetic disk cartridge is loaded in the disk drive. Therefore, even if the housing is formed into the shape of a disk, the magnetic disk cartridge can be positioned within the disk drive in a direction of capable of recording and reproduction.

In the case where two protrusions are disposed along a straight line passing through the center of the main surface of the housing and are disposed across the center, the magnetic disk cartridge can be reliably located at a position where the magnetic head of the disk drive can access a magnetic disk, in cooperation with the guide portion of the disk drive, even when the magnetic disk cartridge is inserted into the disk drive at any angle. After the magnetic disk cartridge is loaded in the disk drive, positional shift of the magnetic disk cartridge can be prevented.

Particularly in the case where the two protrusions have different heights from the main surface, a guide groove is provided in the disk drive so that the protrusion lower in height can move into the groove and the protrusion higher in height cannot move into the groove. Therefore, there is an advantage that positioning of the magnetic disk cartridge becomes extremely easy.

In the case where the housing is equipped with a plurality of openings having a shutter, any one of the openings can be positioned in a direction capable of recording and reproduction by the above-described protrusions. Therefore, even if the housing is formed into the shape of a disk, the magnetic disk cartridge can be reliably located within the disk drive at a direction of capable of recording and reproduction.

As described above, the aforementioned housing may have on its side face a pair of openings that have the shutter and are symmetrical with respect to the center of the main surface of the housing. This housing also has cutouts that communicate with the openings and are formed in the main surface. The protrusions are provided to cover the cutouts. In this case, at the position of the cutout, the height of the opening in the thickness direction can be increased by the quantity of the cutout. Therefore, it becomes possible to insert a plurality of magnetic heads into the opening. As a result, a magnetic disk cartridge with a large recording capacity can be provided.

In accordance with the second magnetic disk cartridge of the present invention, the housing has a guide groove for positioning the magnetic disk cartridge in a direction capable of recording and reproduction in cooperation with the protruding portion provided within the slot of the disk drive when the magnetic disk cartridge is loaded in the disk drive. Therefore, the magnetic disk cartridge can be inserted smoothly into the slot of the disk drive. Furthermore, the magnetic disk cartridge is guided into the disk drive by cooperation of the guide groove of the magnetic disk cartridge and the protruding portion of the disk drive. Therefore, smooth insertion and reliable positioning of the magnetic disk cartridge becomes possible and incorrect insertion can be prevented.

BRIEF DESCRIPTION OF THE DRAWINGS

The present invention will be described in further detail with reference to the accompanying drawings wherein:

FIG. 18A is a plan view showing a magnetic disk cartridge constructed in accordance with a seventh embodiment of the present invention;

FIG. 18B is a side view of the magnetic disk cartridge shown in FIG. 18A;

FIG. 18C is a plan view of a disk drive into which the magnetic disk cartridge of FIG. 18A is inserted;

FIG. 19A is a plan view showing the state in which the magnetic disk cartridge of FIG. 18 is loaded in the disk drive;

FIG. 19B is a bottom view showing the state in which the magnetic disk cartridge of FIG. 18 is loaded in the disk drive;

FIG. 19C is a side view showing the state in which the magnetic disk cartridge of FIG. 18 is loaded in the disk drive;

DESCRIPTION OF THE PREFERRED EMBODIMENTS

Preferred embodiments of the present invention will hereinafter be described in detail with reference to the drawings. Note that to facilitate comprehension, the components depicted in the figures are shown with their dimensions at different ratios from those in actuality.

Figure 1:
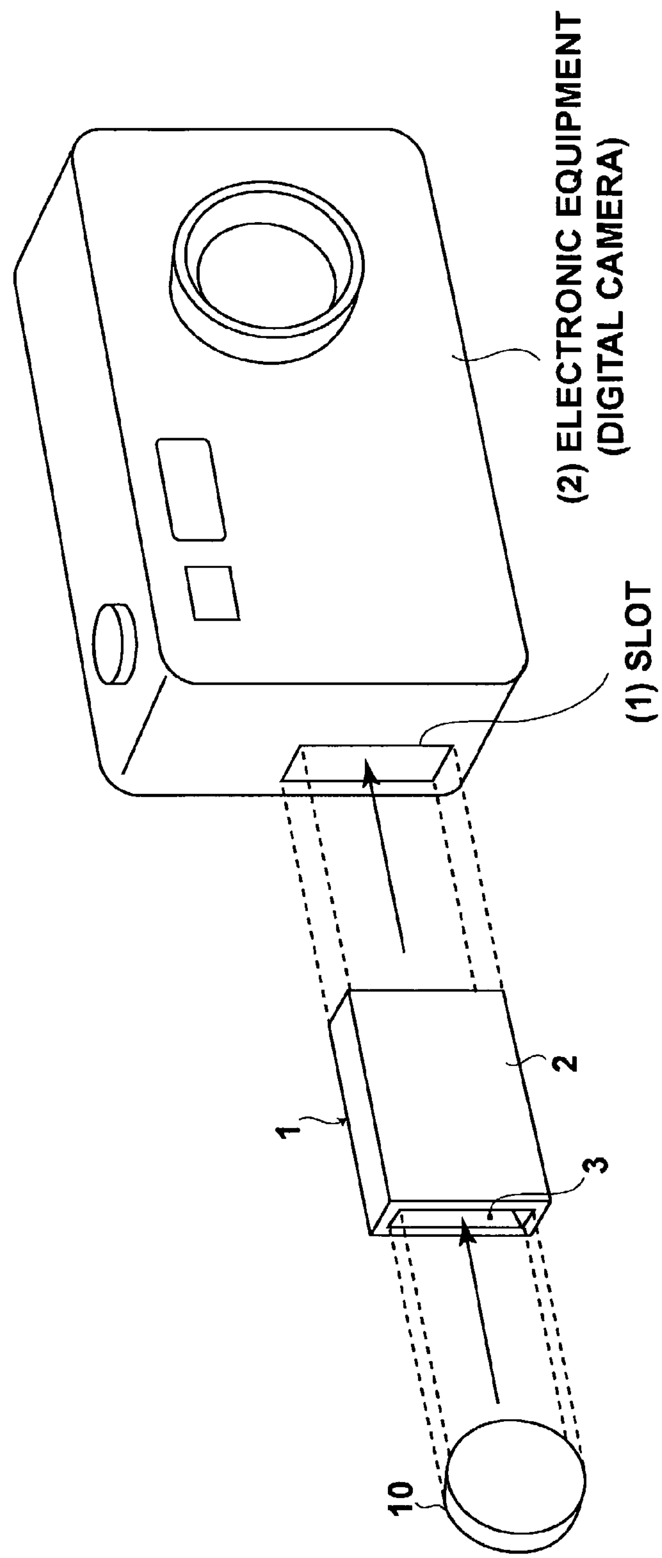
FIG. 1 is a perspective view showing how a magnetic disk cartridge according to the present invention is used in a digital camera.

FIG. 1 is a perspective view that shows how a magnetic disk cartridge according to the present invention is used in a digital camera. The magnetic disk cartridge 10 with a rotatable magnetic disk housed therein is loaded in a disk drive 1 through a slot-shaped opening 3 formed in the housing 2 of the disk drive 1. The disk drive 1 is equipped with a drive mechanism for rotating a magnetic disk, a magnetic head for recording or reproducing information on or from the magnetic disk, and an input-output interface for communicating with electronic equipment such as a digital camera, a PC, to which the disk drive 1 is mounted.

When information is recorded on or reproduced from the magnetic disk, the magnetic disk cartridge 10 is first loaded in the disk drive 1. Then, the disk drive 1 with the magnetic disk cartridge 10 is inserted, for example, into a slot provided in electronic equipment such as a digital camera, etc. Next, information is recorded on or reproduced from the magnetic disk of the magnetic disk cartridge 10 through the disk drive 1 by electronic equipment such as a digital camera, etc.

Figure 2:
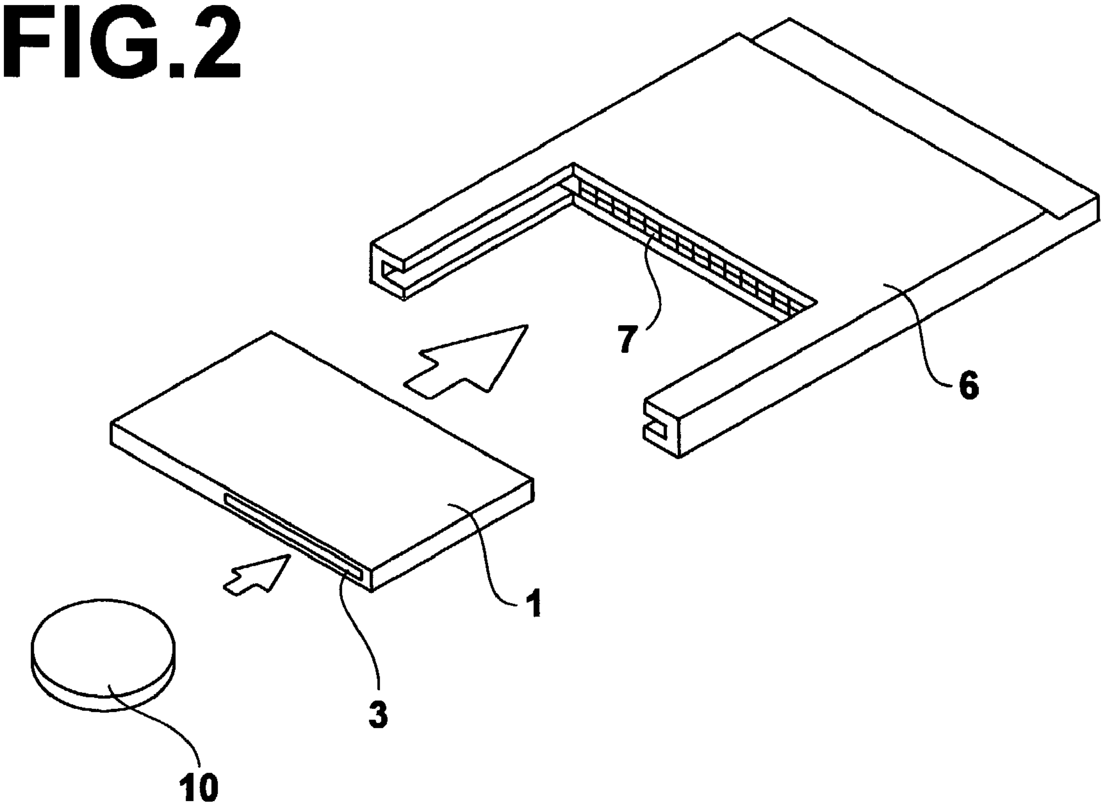
FIG. 2 is a perspective view showing how the magnetic disk cartridge according to the present invention is used in a PC card for a PC.

FIG. 2 shows a magnetic disk cartridge 10, which is inserted into the slot-shaped opening 3 of a disk drive 1. The disk drive 1 is connected electrically with the socket 7 of the receiving portion of a PC card 6, which is inserted into a PC card slot provided in a PC.

In the magnetic disk cartridge 10 shown in FIG. 1 or 2, a magnetic disk is rotatably housed within a disk housing, shaped like a coin. The magnetic disk is preferably a high density magnetic recording medium employing barium ferrite powder.

Figure 3A:
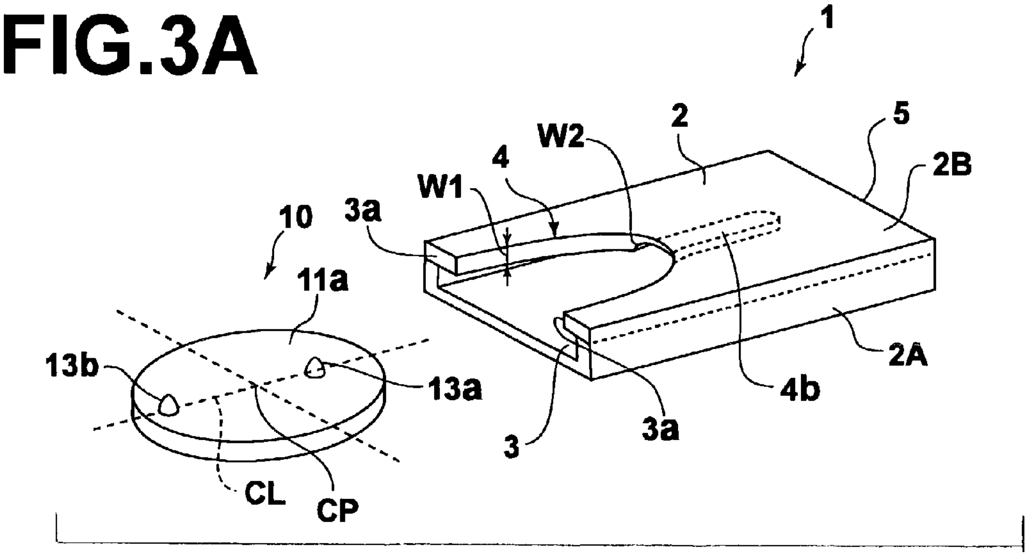
FIG. 3A is a perspective view showing a magnetic disk cartridge constructed in accordance with a first embodiment of the present invention, and a disk drive in which the magnetic disk cartridge is loaded.
Figure 3B:
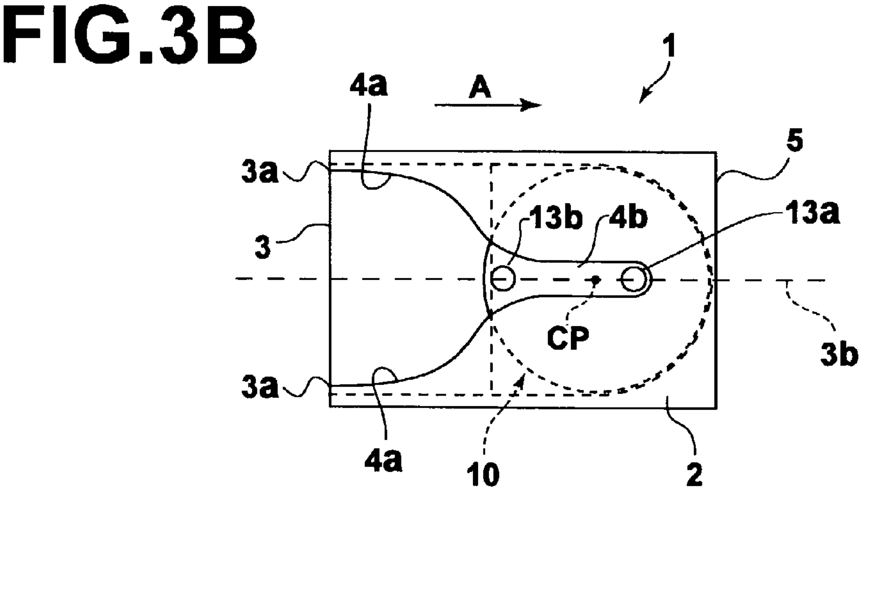
FIG. 3B is a plan view of the magnetic disk cartridge loaded in the disk drive, the upper plate of a housing 2 being removed to show a guide portion.

FIG. 3 shows a magnetic disk cartridge 10 constructed in accordance with a first embodiment of the present invention, and a disk drive 1 in which the magnetic disk cartridge 10 is loaded. FIG. 3A shows a perspective view of the unloaded state. FIG. 3B shows a plan view of the loaded state, the upper plate 2B of a housing 2 being removed to show a guide portion.

The housing 2 of the disk drive 1 has a flat space for housing the magnetic disk cartridge 10, between a lower plate 2A and an upper plate 2B. Although not shown, the housing 2 also has a drive mechanism for rotating a magnetic disk, a magnetic head, a magnetic-head holder for supporting the magnetic head, and a signal processing section for recording or reproducing information between the magnetic head and the magnetic disk.

The housing 2 of the disk drive 1 is further provided with an opening 3, a guide portion 4, and an input-output interface 5. The opening 3 is formed in one side face of the housing 2, and through this opening 3, the magnetic disk cartridge 10 is inserted into the housing 2.

The guide portion 4 is formed in the upper plate 2 (thickness W1) of the housing 2 and extends from the opening 3 toward the input-output interface 5. The guide portion 4 is constructed by a first guide portion 4*a* and a second guide portion 4*b*. The first guide portion 4*a* consists of curved surfaces extending from both sides 3*a* and 3*b* of the opening 3 toward the centerline 3*b* of the housing 2. The second guide portion 4*b* consists of a groove (depth W2) formed in the bottom surface of the upper plate 2B of the housing 2 along the centerline 3*b* of the housing 2. The first guide portion 4*a* has the function of contacting the protrusion 13*a* or 13*b* of the magnetic disk cartridge 10 and guiding the protrusion 13*a* or 13*b* toward the centerline 3*b*, when the magnetic disk cartridge 10 is inserted into the disk drive 1 through the opening 3.

Meanwhile, the magnetic disk cartridge 10 is equipped with a housing 11, which has an outer diameter and a thickness slightly smaller than the width and height of the opening 3 of the disk drive 1. This housing 11 has the above-described protrusions 13*a* and 13*b* on the main surface 11*a*. The radially inner and outer protrusions 13*a* and 13*b* are provided along the centerline CL passing through the center point CP of the main surface 11*a* and across the center point CP.

The radially inner protrusion 13*a* is provided at a position close to the center point CP of the main surface 11*a*, while the radially outer protrusion 13*b* is provided near the outer edge of the main surface 11*a*. In addition, the radially inner protrusion 13*a* is lower in height than the radially outer protrusion 13*b* and has a height capable of being inserted into the second guide portion 4*b* of the disk drive 1. The radially outer protrusion 13*b* has a height capable of preventing it from being inserted into the second guide portion 4*b*.

Therefore, when the magnetic disk cartridge 10 is loaded in the disk drive 1, the radially inner protrusion 13*a* can move within the second guide portion 4*b* along the centerline 3*b*. If the radially inner protrusion 13*a* reaches the end of the second guide portion 4*b*, the movement of the magnetic disk cartridge 10 in the direction of arrow A is stopped. On the other hand, the radially outer protrusion 13*b* is vertically aligned in the vicinity of the inlet of the second guide portion 4*b* with the centerline 3*b*, as shown in FIG. 3B. In this way, the magnetic disk cartridge 10 is disposed at a position where information can be recorded on or reproduced from the magnetic disk.

On the other hand, in the case where the radially outer protrusion 13*b* is first inserted when the magnetic disk cartridge 10 is loaded in the disk drive 1, the radially outer protrusion 13*b* cannot move into the second guide portion 4*b* because of its height and therefore the magnetic disk cartridge 10 cannot be loaded in the disk drive 1. In addition, the magnetic disk cartridge 10 cannot be inserted into the disk drive 1 if it is flipped because of the protrusions 13*a* and 13*b*. Furthermore, the presence of the protrusions 13*a* and 13*b* makes it possible to discriminate the top surface of the magnetic disk cartridge 10 from the bottom surface by the sense of touch.

Note that even in the case where the height of the radially outer protrusion 13*b* is made the same as that of the radially inner protrusion 13*a* so that the radially outer protrusion can also move into the second guide portion 4*b*, the magnetic disk cartridge 10 facing in the opposite direction cannot be loaded in the disk drive 1, if the distance of the radially inner protrusion 13*a* from the center point CP differs from that of the radially outer protrusion 13*b*. That is, because the radially outer protrusion 13*b* is formed near the outer edge of the main surface 11*a*, the magnetic disk cartridge 10 cannot be completely inserted into the disk drive 1, even if the radially outer protrusion 13*b* moves into the second guide portion 4*b* and reaches the end of the second guide portion 4*b*.

The input-output interface 5 is disposed, for example, on the front face of the housing 2 at the opposite end from the opening 3. This input-output interface 5 is connected electrically with electronic equipment such as a PC, a digital camera, a personal digital assistant (PDA), a portable telephone, etc. Information to be recorded on the magnetic disk within the magnetic disk cartridge 10 is input via the input-output interface 5, while information reproduced from the magnetic disk is output from the input-output interface 5.

Figure 4A:
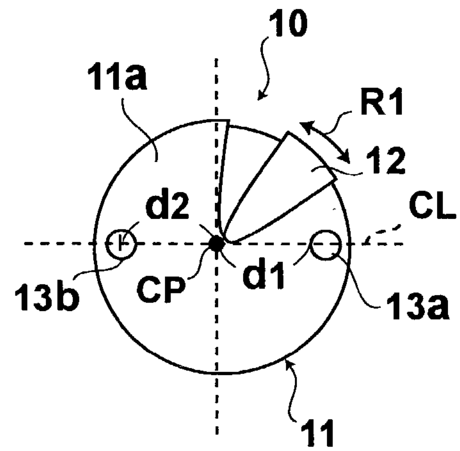
FIG. 4A is a plan view showing the detailed structure of the magnetic disk cartridge shown in FIG. 3A.
Figure 4B:
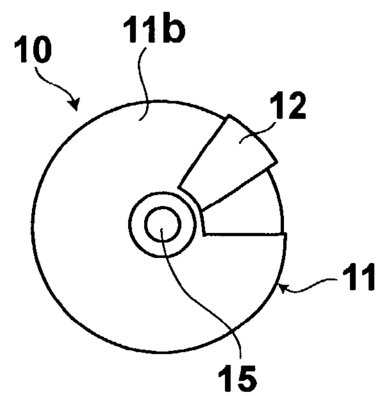
FIG. 4B is a bottom view showing the detailed structure of the magnetic disk cartridge shown in FIG. 3A.
Figure 4C:
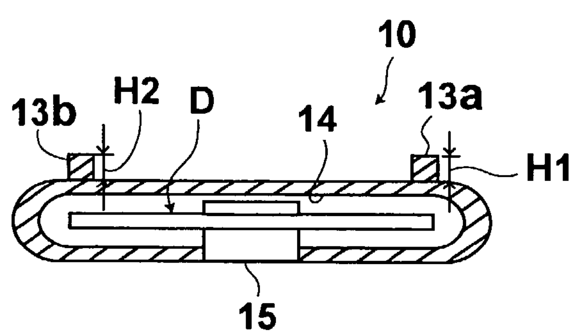
FIG. 4C is a sectional view showing the detailed structure of the magnetic disk cartridge shown in FIG. 3A.

FIG. 4 shows the detailed structure of the magnetic disk cartridge 10 shown in FIG. 3, wherein FIG. 4A is a plan view, FIG. 4B is a bottom view, and FIG. 4 is a schematic cross sectional view taken along the center line CL.

The magnetic disk cartridge 10 is equipped with a generally disk-shaped housing 11 of resin. Within the housing 11, a magnetic disk D is rotatably housed. The housing 11 is provided with a shutter 12 and protrusions 13*a* and 13*b*. The housing 11 further has a flat space 14 for housing the magnetic disk D. The magnetic disk D is held within the housing 11 by a center core 15. The center core 15 is exposed through a hole formed in the bottom surface 11*b* of the housing 11. If the center core 15 is connected with the spindle of the disk drive 1, the magnetic disk D held by the center core 15 is rotated.

The shutter 12, movably attached to the housing 11, is opened when the magnetic disk cartridge 10 is loaded in the disk drive 11, and it is closed when the magnetic disk cartridge 10 is ejected from the disk drive 11. If the shutter 12 is opened, a portion of the magnetic disk D is exposed and information can be recorded or reproduced.

The main surface 11*a* of the housing 11 is provided with two protrusions 13*a* and 13*b*. These protrusions 13*a* and 13*b* may be formed integrally with the housing 11. Alternatively, they may be formed separately from the housing 11 and fixed on the main surface 11*a* by an adhesive, etc.

As described above, the protrusions 13*a* and 13*b* are provided on the centerline CL passing through the center point CP of the main surface 11*a* of the housing 11 and across the center point CP. The heights H1 and H2 of the protrusions 13*a* and 13*b* may be the same or different, as long as they protrude from the main surface 11*a*. For example, if the height H1 of the protrusion 13*a* close to the shutter 12 is lower than the height H2 of the other protrusion 13*b*, only the radially inner protrusion 13*a* can be inserted into the second guide portion 4*b*. Therefore, this case is preferable.

That is, only when the radially inner protrusion 13*a* is inserted into the second guide portion 4*b* can the magnetic disk cartridge 10 be loaded in the disk drive 1. On the other hand, the radially outer protrusion 13*b* cannot be inserted into the second guide portion 4*b* because of the height H2, so the magnetic disk cartridge 10 cannot be loaded in the disk drive 1. In such a case, if a user rotates the magnetic disk cartridge 10 in the direction of arrow R1, the radially inner protrusion 13*a* will be positioned in a direction capable of contacting the second guide portion 4*b*.

In this way, the magnetic disk cartridge 10 can be reliably loaded in the disk drive 1 in a direction capable of recording or reproducing information. As a result, users can be prevented from mistaking the inserting direction of the magnetic disk cartridge 10. In addition, if the heights of the protrusions 13*a* and 13*b* are made different from each other, users can recognize the inserting direction of the magnetic disk cartridge 10 with the sense of touch. Therefore, even if the magnetic disk cartridge 10 is formed into the shape of a disk, mistaking the inserting direction can be prevented.

Note that in the case where the two protrusions 13*a* and 13*b* are the same in height, a recess may be provided around the radially outer protrusion 13*b* so that users can recognize the inserting direction of the magnetic disk cartridge 10 with the sense of touch and can easily grip the magnetic disk cartridge 10.

The radially inner protrusion 13*a* is disposed at a position away from the center point CP of the main surface 11*a* by distance d1. The radially outer protrusion 13*b* is disposed at a position away from the center point CP by distance d2, which is greater than distance d1 (d2>d1). Therefore, when the magnetic disk cartridge 10 is inserted into the disk drive 1 with the radially inner protrusion 13*a* facing toward the first guide portion 4*a*, the protrusion 13*a* first contacts the first guide portion 4*a*. As a result, the magnetic disk cartridge 10 is rotated and moved along the first guide portion 4*a*, or it is rotated and moved because the side face of the housing 11 abuts the opening 3. Therefore, if the user inserts the magnetic disk cartridge 10 while rotating it along the direction of rotation, the magnetic disk cartridge 10 is positioned so that the radially inner protrusion 13*a* is inserted into the second guide portion 4*b*.

On the other hand, when the radially outer protrusion 13*b* is first contacted with the first guide portion 4*a*, the radially inner protrusion 13*a* does not contact the first guide portion 4*a*, because the distance d1 is shorter than the distance d2. Therefore, the magnetic disk cartridge 10 rotates toward a direction where there is no mechanical contact resistance, and the radially inner protrusion 13*a* is brought into contact with the first guide portion 4*a*. If the user inserts the magnetic disk cartridge 10 while rotating it along the direction of rotation, the radially inner protrusion 13*a* is positioned so that it is inserted into the second guide portion 4*b*. Note that as the height H2 of the radially outer protrusion 13*b* is higher than the bottom position (depth W2) of the groove of the second guide portion 4*b*, there is no possibility that the protrusion 13*b* will be inserted into the second guide portion 4*b*.

Thus, if the distance of the radially inner protrusion 13*a* from the center point CP differs from that of the radially outer protrusion 13*b*, the magnetic disk cartridge 10 can be directed correctly in the inserting direction. Even if the magnetic disk cartridge 10 is formed into the shape of a disk, the cartridge 10 can be reliably loaded in the disk drive 1 so that information can be recorded or reproduced.

FIG. 5 shows how the magnetic disk cartridge 10 of FIG. 4 is inserted into the disk drive 1. In the magnetic disk cartridge 10 shown in FIG. 5, when a portion of the magnetic disk D exposed by the shutter 12 is positioned in an accessible region RA formed near the centerline 3*b* of the disk drive 1, information can be recorded or reproduced.

Figure 5A:
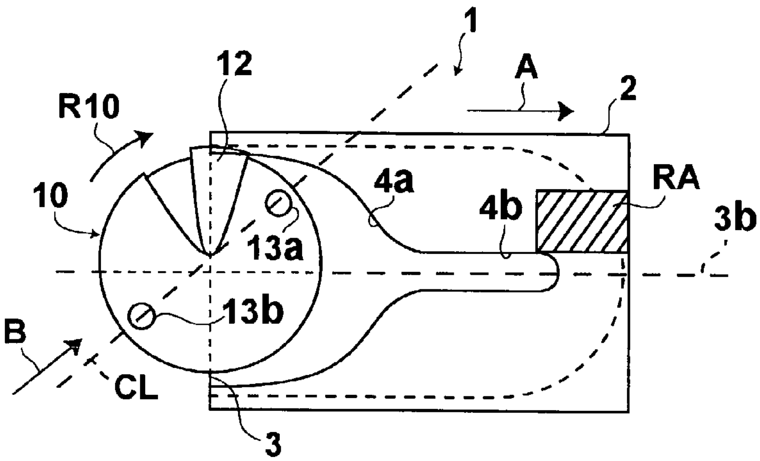
FIGS. 5A to 5C are plan views of how the magnetic disk cartridge of FIG. 4 is inserted into the disk drive.

First, as shown in FIG. 5A, suppose the case where the magnetic disk cartridge 10 is positioned at the opening 3 of the disk drive 1 and inserted in the direction of arrow B. In this case, the radially inner protrusion 13*a* of the magnetic disk cartridge 10 is brought into contact with the first guide portion 4*a* of the disk drivel. Note that when the radially outer protrusion 13*b* is first inserted into the opening 3 of the disk drive 1, the radially inner protrusion 13*a* is moved along the first guide portion 4*a*, if the user applies force in the direction of arrow R10, as described above.

If force in the direction of arrow B is applied to the magnetic disk cartridge 10, the radially inner protrusion 13*a* moves in the direction of arrow A along the curved surface of the first guide portion 4*a*. At the same time, the magnetic disk cartridge 10 is inserted into the disk drive 1 while being rotated in the direction of R10. Therefore, the angle of the magnetic disk cartridge 10 is adjusted by the first guide portion 4*a*. When the radially inner protrusion 13*a* reaches the inlet of the second guide portion 4*b*, adjustments to the angle of the magnetic disk cartridge 10 are completed.

On the other hand, when the magnetic disk cartridge 10 is flipped and an attempt is made to insert it into the disk drive 1, the protrusions 13*a* and 13*b* abut the edge portion of the opening 3 of the housing 2, and consequently, it becomes impossible to insert the magnetic disk cartridge 10 into the opening 3. In this way, the magnetic disk cartridge 10 is prevented from being inserted when it is flipped over.

When the magnetic disk cartridge 10 is inserted into the opening 3, there are cases where the centerline CL between the protrusions 13*a* and 13*b* crosses the centerline 3*b* of the disk drive 1 at approximately right angles. In such a case, if the user applies force in the direction of arrow R10, the radially inner protrusion 13*a* is moved along the first guide portion 4*a*, as described above. As a result, the centerline CL between the protrusions 13*a* and 13*b* is aligned with the centerline 3*b* of the disk drive 1.

In the aforementioned case, the magnetic disk cartridge 10 is inserted in the direction of arrow B. However, this description has been made in consideration of the case where with the disk drive 1 held in the left hand, the magnetic disk cartridge 10 is inserted with the index finger of the right hand. Therefore, even when in the state shown in FIG. 5A the user applies force in the direction of arrow A, the above-described operation is performed.

Figure 5B:
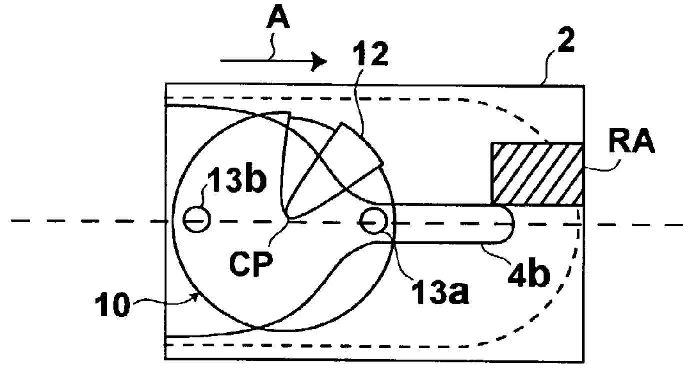

Next, as shown in FIG. 5B, the magnetic disk cartridge 10 is moved in the direction of arrow A by the user, and the radially inner protrusion 13*a* is moved to the centerline 3*b* along the second guide portion 4*b*. At the same time, within the first guide portion 4*a*, the radially outer protrusion 13*b* is moved from the outside of the opening 3 toward the centerline 3*b*. If the radially inner protrusion 13*a* reaches the end of the second guide portion 4*b*, the movement of the magnetic disk cartridge 10 in the direction of arrow A is stopped. At this time, the radially outer protrusion 13*b* reaches the inlet of the second guide portion 4*b*. A portion of the magnetic head D exposed by the shutter 12 is positioned in the region RA of the disk drive 1 where information can be recorded or reproduced.

In this manner, the magnetic disk cartridge 10 can be positioned by the protrusions 13*a* and 13*b* and the guide portion 4 so that information can be recorded or reproduced. That is, even in the case where the magnetic disk cartridge 10 is formed into the shape of a disk, the magnetic disk cartridge 10 can be loaded so that the shutter 12 of the magnetic disk cartridge 10 is held at a predetermined position. After the magnetic disk cartridge 10 is loaded in the disk drive 1, the radially inner protrusion 13*a* is inserted into the second guide portion 4*b*, and the radially outer protrusion 13*b* is held in the continuous portion between the first guide portion 4*a* and the second guide portion 4*b*. Therefore, rotation of the magnetic disk cartridge 10 is regulated and there is no possibility that the direction of the magnetic disk cartridge 10 will be changed even during loading.

Figure 5C:
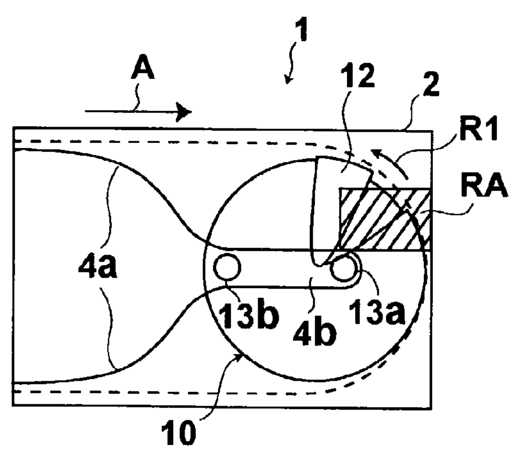
Figure 6A:
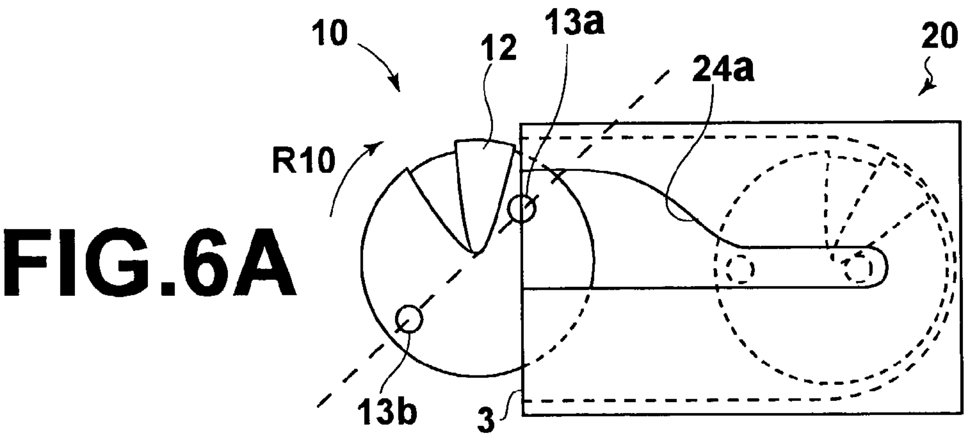
FIGS. 6A to 6C are plan views showing modifications of the disk drive.

Note that the guide 4 shown in FIG. 5 may alternatively be formed as shown in FIG. 6. While the first guide portions 4*a* in FIG. 5 are provided on both sides of the centerline 3*b*, a first guide portion 24*a* may be provided on one side of the centerline 3*b*, as in a disk drive 20 of FIG. 6A. The guide portion 24*a* is continuous with a second guide portion 24*b*, which is formed into the shape of a straight line.

Figure 6B:
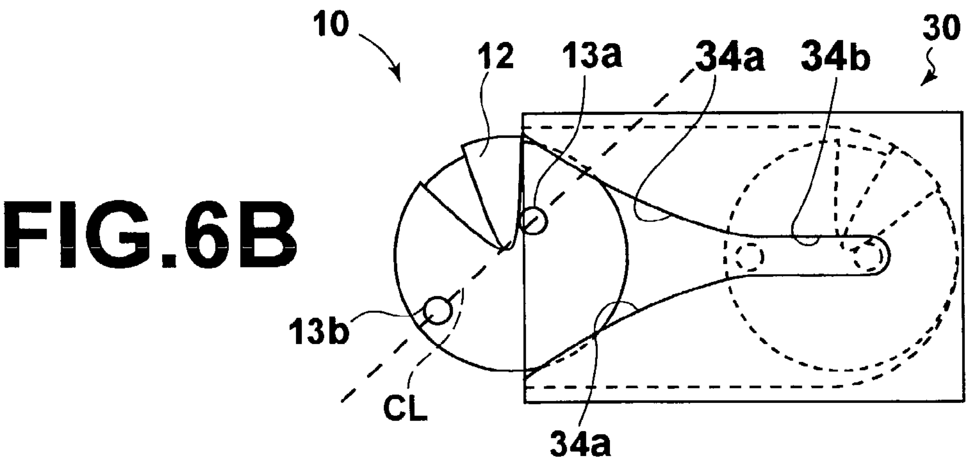

While the first guide portion 4*a* in FIG. 5 consists of a curved surface, the first guide portion 34*a* of a disk drive 30 in FIG. 6B may be formed into the shape of a taper. The first guide portion 34*a* may be continuous to a second guide portion 34*b*.

Figure 6C:
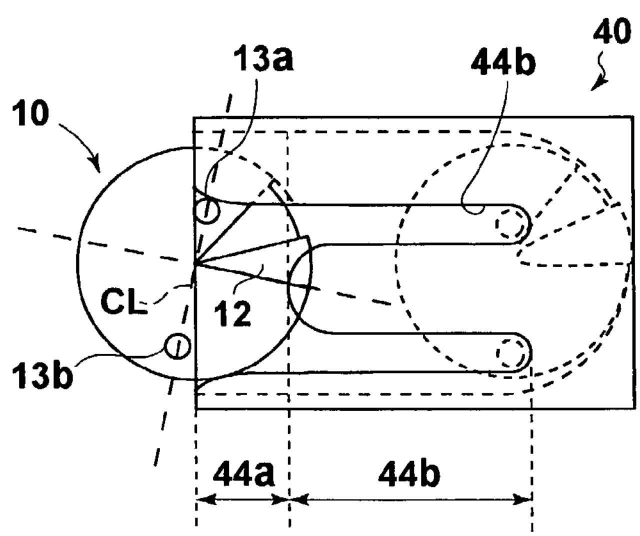

Furthermore, in FIG. 5, while a single second guide portion 4*b* is formed along the centerline 3*b*, second guide portions 44*b* and 44*b* for projections 13*a* and 13*b* may extend from a first guide portion 44*a*, as in a disk drive 40 of FIG. 6C. In this case, the shutter 12 is provided on a line crossing the centerline CL at approximately right angles.

Figure 7:
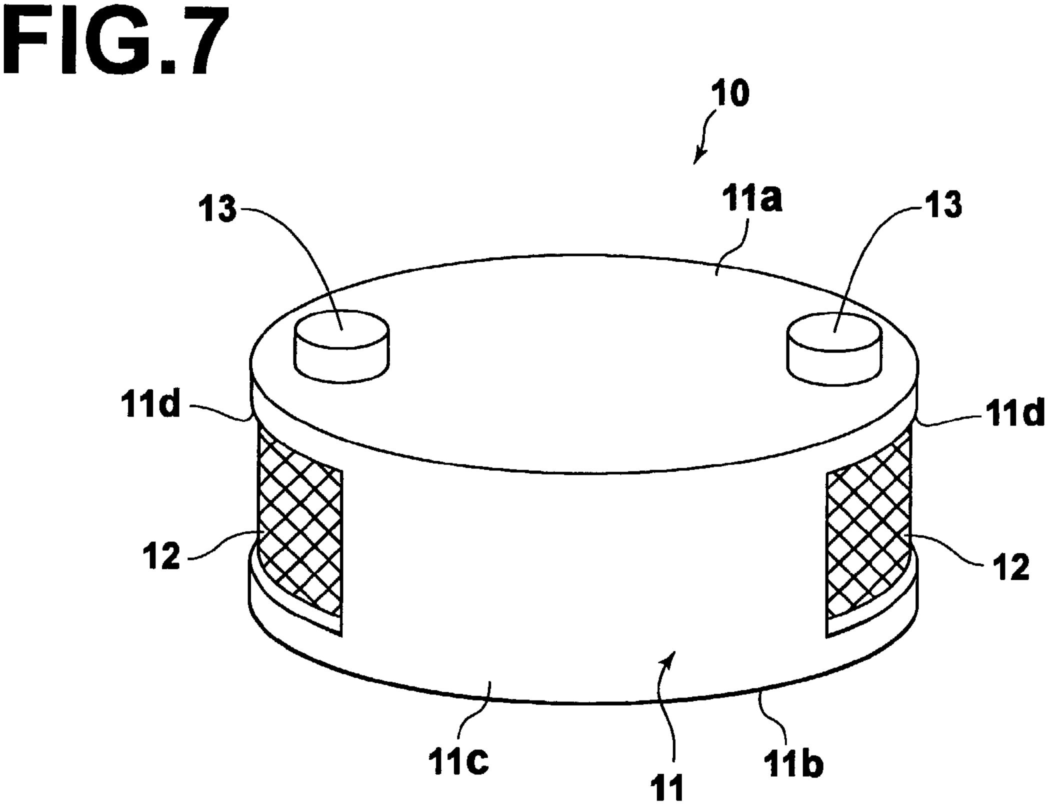
FIG. 7 is a perspective view showing a magnetic disk cartridge constructed in accordance with a second embodiment of the present invention.

FIG. 7 shows a magnetic disk cartridge 10 constructed in accordance with a second embodiment of the present invention. The magnetic disk cartridge 10 has two openings 11*d* and 11*d*, which are formed in the side face 11*c* of a disk housing 11. The openings 11*d* and 11*d* are disposed at positions shifted 180 degrees, that is, positions facing each other. The openings 11*d* and 11*d* are provided with movable shutters 12 and 12, respectively. Note that the shutters 12 may be formed from separate members. Alternatively, the shutters 12 may be formed from a single cylindrical member so that they are opened or closed by rotating the single cylindrical member.

Figure 8A:
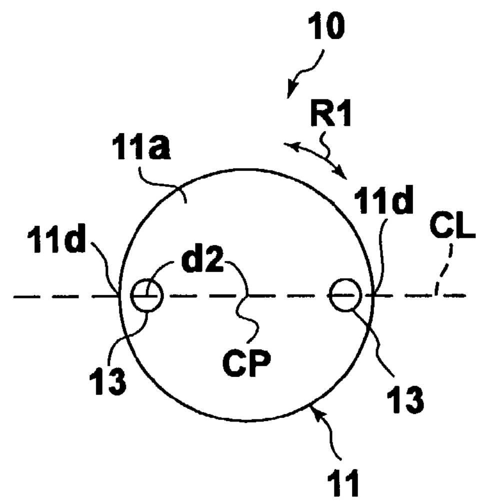
FIG. 8A is a plan view of the magnetic disk cartridge shown in FIG. 7.
Figure 8B:
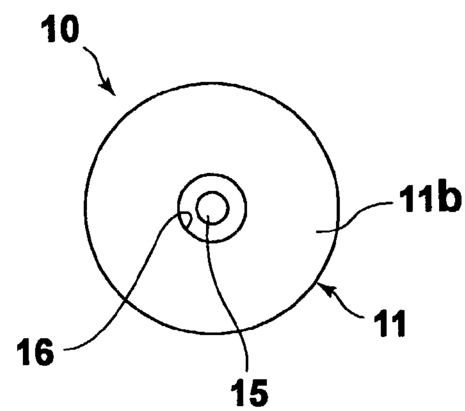
FIG. 8B is a bottom view of the magnetic disk cartridge shown in FIG. 7.
Figure 8C:
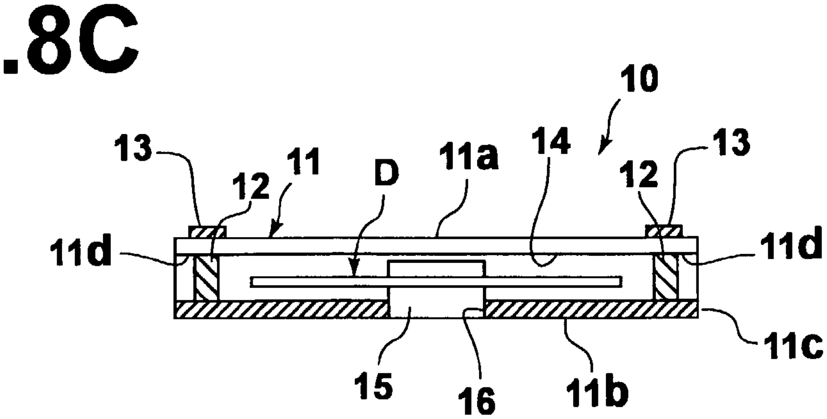
FIG. 8C is a sectional view of the magnetic disk cartridge shown in FIG. 7.

FIGS. 8A to 8C are a plan view, a bottom view, and a sectional view of the magnetic disk cartridge 10 shown in FIG. 7.

As shown in FIG. 8A, protrusions 13, 13 are provided on a centerline CL passing through the center point CP of the main surface 11*a* of the housing 11 and are also provided at positions corresponding to the openings 11*d*, 11*d*. Since the protrusions 13, 13 are provided above the openings 11*d*, 11*d*, the wall on each opening 11*d* can be made thicker. Therefore, a reduction in the rigidity of the housing 11 due to the opening 11*d* can be reinforced by the protrusions 13, 13.

Note that the protrusions 13, 13 may be formed integrally with the housing 11. Alternatively, they maybe formed separately from the housing 11 and mounted on the housing 11 with an adhesive, etc. The two protrusions 13, 13 will be satisfied if they protrude from the main surface 11*a* of the housing 11

As shown in FIG. 8C, the housing 11 has a hollow space 14 for housing a magnetic disk D. The magnetic disk D is held within the housing 11 by a center core 15. The center core 15 is exposed through a drive hole 16 formed in the bottom surface 11*b* of the housing 11. If the center core 15 is connected with the spindle of the disk drive 1, the magnetic disk D held by the center core 15 is rotated. In this way, information is recorded or reproduced.

Figure 9A:
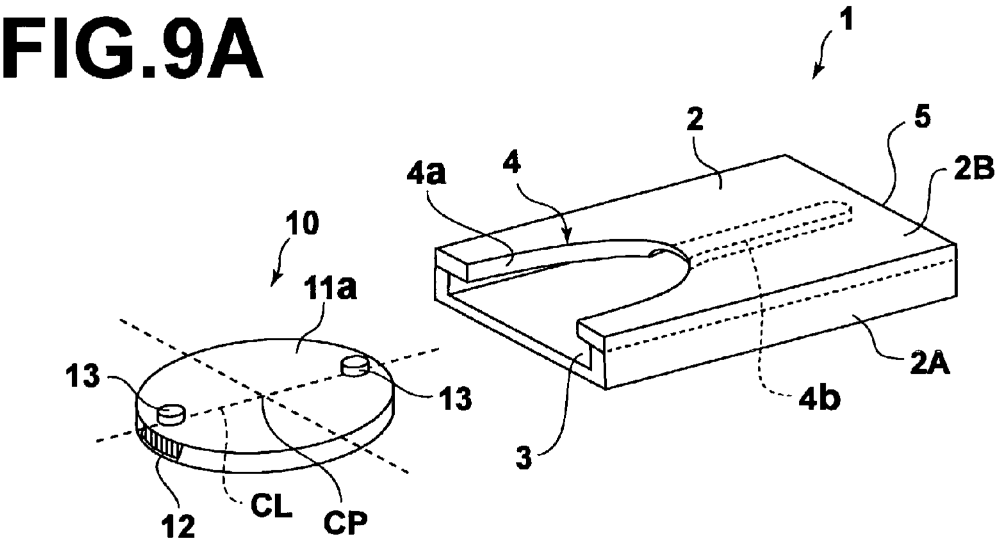
FIG. 9A is a perspective view showing the magnetic disk cartridge of FIG. 8, and a disk drive in which the magnetic disk cartridge is loaded.
Figure 9B:
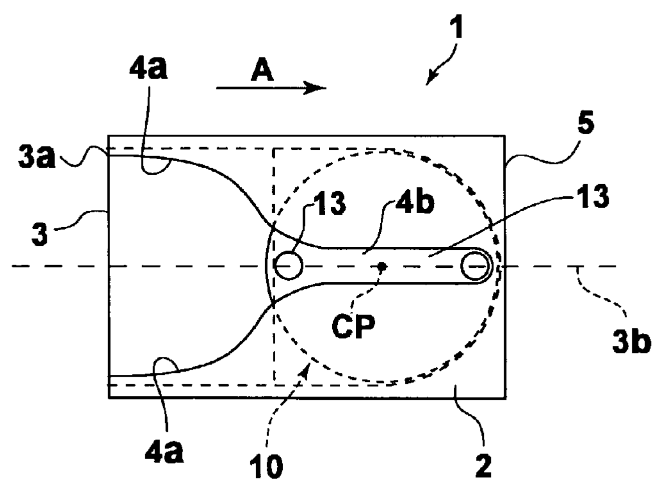
FIG. 9B is a plan view of the magnetic disk cartridge loaded in the disk drive, the upper plate of a housing being removed to show a guide portion.

FIGS. 9A and 9B correspond to FIGS. 3A and 3B, respectively. The disk drive in FIG. 9 is the same as that shown in FIG. 3. However, the magnetic disk cartridge 10 of FIG. 9 is provided with two openings 11*d*, 11*d*. Therefore, the magnetic disk cartridge 10 of FIG. 9 differs from that of FIG. 3 in that two protrusions 13, 13 of the same height are disposed at positions of equal distances from the center.

Figure 10A:
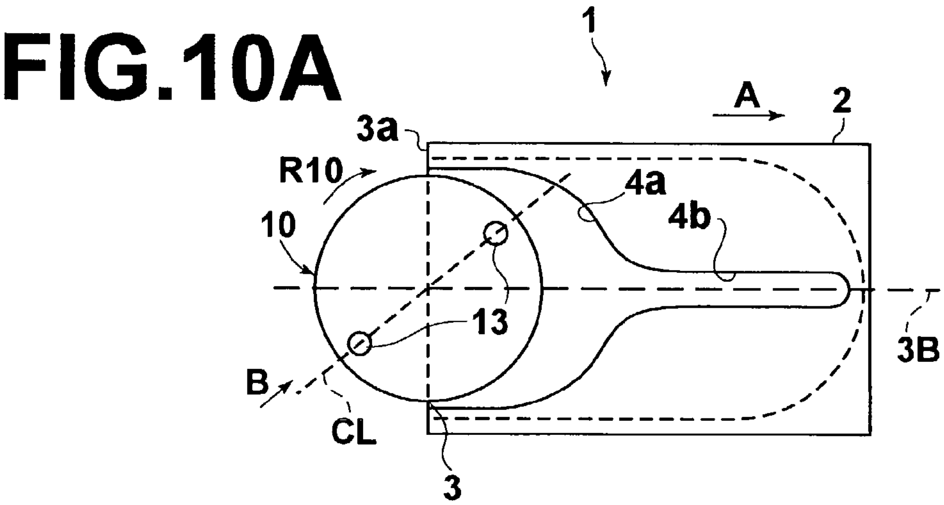
FIGS. 10A to 10C are plan views of how the magnetic disk cartridge of FIG. 8 is inserted into the disk drive.
Figure 10B:
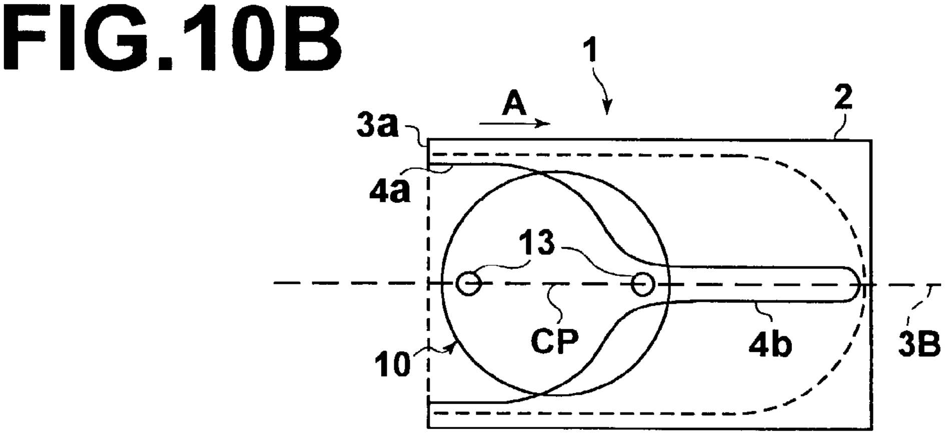
Figure 10C:
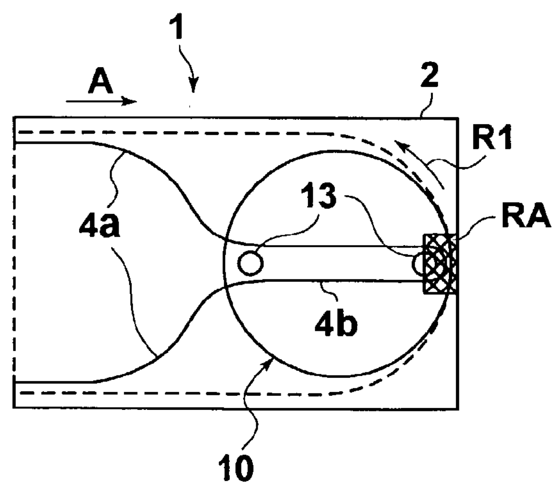

FIGS. 10A to 10C show how the magnetic disk cartridge of FIG. 8 is inserted into the disk drive, and are plan views that correspond to FIGS. 5A to 5C, respectively. In the case of FIG. 10, the magnetic disk cartridge 10 is provided with two openings 11*d*, 11*d*. Therefore, two protrusions 13, 13 of the same height are disposed at positions of equal distances from the center. As a result, either of the two openings 11*d* can be positioned in an area RA where information can be recorded or reproduced.

Figure 11A:
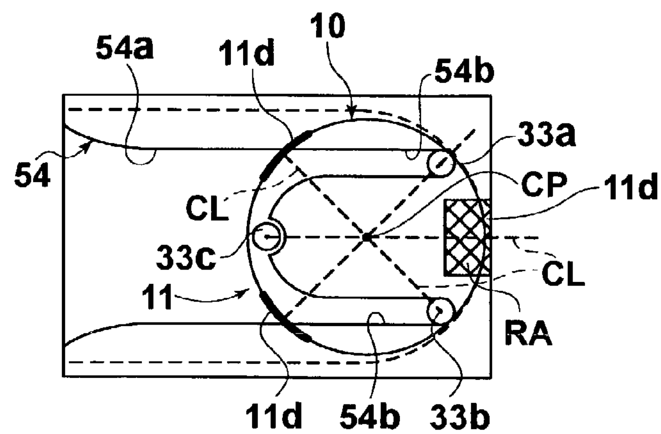
FIG. 11A is a plan view showing a magnetic disk cartridge and a disk drive constructed in accordance with a third embodiment of the present invention.
Figure 11B:
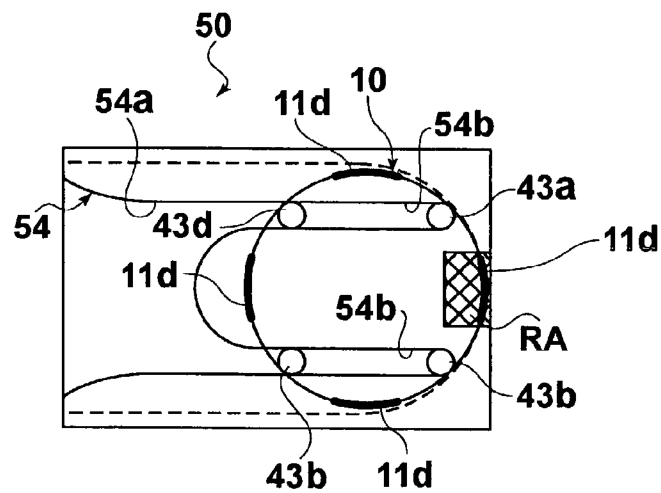
FIG. 11B is a plan view showing a magnetic disk cartridge and a disk drive constructed in accordance with a fourth embodiment of the present invention.
Figure 12A:
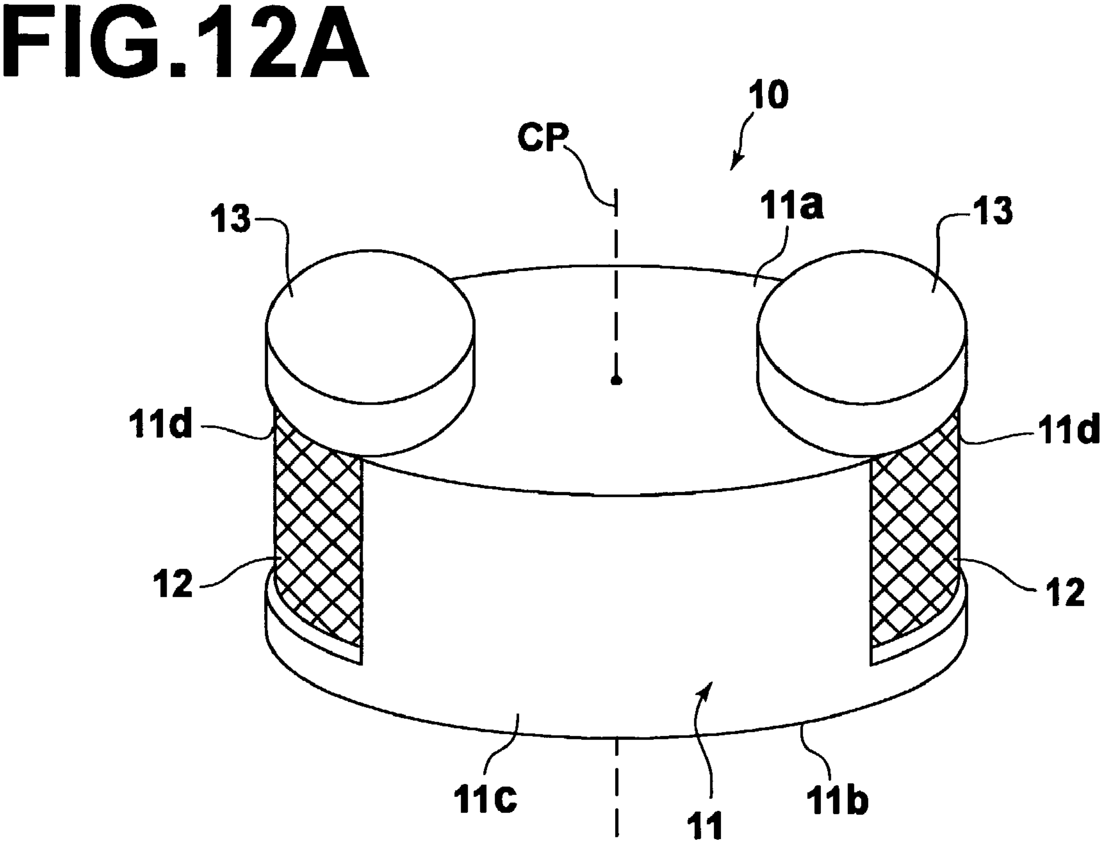
FIG. 12A is a perspective view showing a magnetic disk cartridge constructed in accordance with a fifth embodiment of the present invention.
Figure 12B:
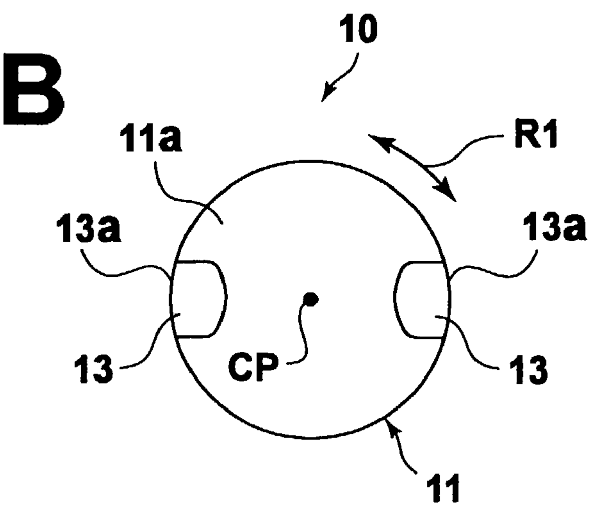
FIG. 12B is a plan view of the magnetic disk cartridge shown in FIG. 12A.
Figure 13A:
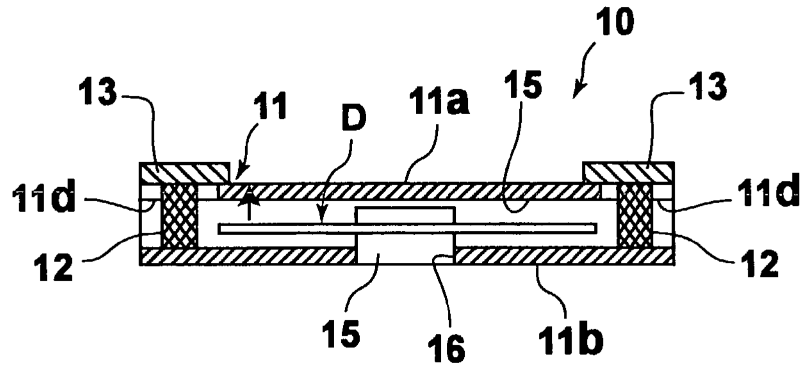
FIG. 13A is a sectional view of the magnetic disk cartridge shown in FIG. 12.
Figure 13B:
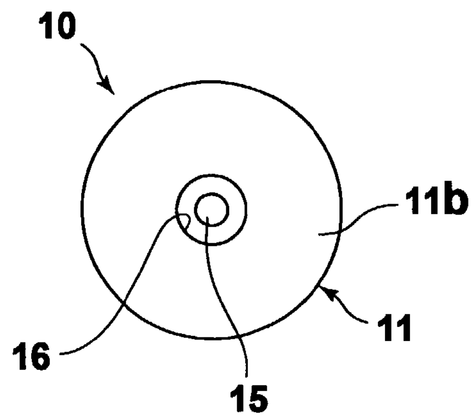
FIG. 13B is a bottom view of the magnetic disk cartridge shown in FIG. 12.

FIG. 11A shows a magnetic disk cartridge and a disk drive constructed in accordance with a third embodiment of the present invention. FIG. 11B shows a magnetic disk cartridge and a disk drive constructed in accordance with a fourth embodiment of the present invention.

The magnetic disk cartridge 10 shown in FIG. 11A is equipped with three openings 11*d* and three shutters 12. The magnetic disk cartridge 10 further has three protrusions 33*a*, 33*b*, and 33*c* on the main surface of a housing 11. The three openings 11*d* are provided on a first line linking the protrusion 33*a* and the center point CP of the housing 11 together, a second line linking the protrusion 33*b* and the center point CP together, and a third line linking the protrusion 33*c* and the center point CP together, respectively. On the other hand, the guide portion 54 of a disk drive 50 includes a first guide portion 54*a* and two second guide portions 54*b*, 54*b*.

In the above-described construction, two of the three protrusions 33*a* to 33*c* are inserted into the second guide portions 54*b* and 54*b* even when the magnetic disk cartridge 10 is inserted in the disk drive 50 in either direction. And any one of three openings 11*d* is positioned in a region RA where information can be recorded or reproduced.

A magnetic disk cartridge 10 in FIG. 11B includes 4 (four) protrusions 43*a* to 43*d* on the main surface of a housing and further includes 4 (four) openings 11*d* and shutters 12. Each of the 4 openings 11*d* is provided between adjacent protrusions, as shown in FIG. 11B.

In the above-described construction, the two protrusions 43*a* and 43*d* and the two protrusions 43*b* and 43*c* are inserted into the second guide portions 54*b* and 54*b* when the magnetic disk cartridge 10 is inserted in a disk drive 50 in either direction. And any one of 4 (four) openings lid is positioned in a region RA where information can be recorded or reproduced.

In accordance with the embodiments shown in FIGS. 11A and 11B, any one of the openings 11*d* can be positioned in the above-described region RA at all times by cooperation of the guide portions and protrusions, even when the magnetic disk cartridge 10 is inserted into the disk drive at any angle. Thus, the present invention is capable of providing a magnetic disk cartridge which users can employ like a coin.

The present invention is not limited to the aforementioned embodiments. In the aforementioned embodiments, the opening 11*d* and the shutter 12 are provided in the side face of the housing 11. However, as in conventional floppy disks, the openings 11*d* may be formed in the main surfaces. The shutter 12 may be provided to cover the openings 11*d*. In this case, protrusions are formed at positions differing from the positions where the openings 11*d* are formed. Even in this case, the magnetic disk cartridge 10 can be positioned in the above-described region RA by cooperation of the protrusions 13, 33*a* to 33*c*, and 43*a* to 43*d* and the guide portion.

In the above-described embodiments, while the protrusions 13, 33*a* to 33*c*, and 43*a* to 43*d* are provided on the main surface 11*a*, they may be provided on the bottom surface 11*b*.

FIGS. 12 to 15 illustrate a magnetic disk cartridge 10 constructed in accordance with a fifth embodiment of the present invention. FIG. 12A shows a perspective view of the magnetic disk cartridge 10. FIG. 12B shows a plan view of the magnetic disk cartridge 10. FIG. 13A shows a sectional view of the magnetic disk cartridge 10. FIG. 13B shows a bottom view of the magnetic disk cartridge 10. FIG. 14A shows an enlarged perspective view of the opening of the magnetic disk cartridge 10. FIG. 14B shows an enlarged sectional view of the opening of the magnetic disk cartridge 10.

As with the above-described embodiments, a housing 11 is formed into the shape of a disk and has an interior space 25 in which a magnetic disk D is rotatably housed. Two openings 11*d*, 11*d* are formed at positions substantially symmetrical with respect to the center point CP of the housing 11, that is, positions shifted from each other by substantially 180 degrees. At the openings 11*d* and 11*d*, shutters 12 are disposed so that they are opened and closed. Note that between FIGS. 12A and 12B, protrusions 13 are different in shape.

Figure 14A:
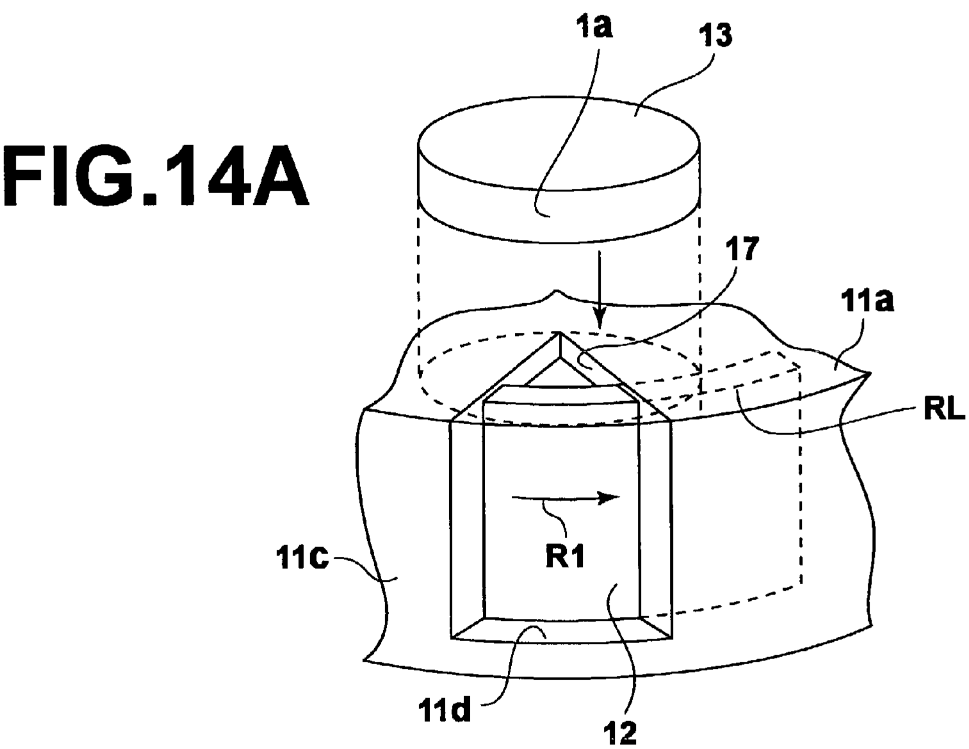
FIG. 14A is an enlarged perspective view showing the opening of the magnetic disk cartridge shown in FIGS. 12 and 13.
Figure 14B:
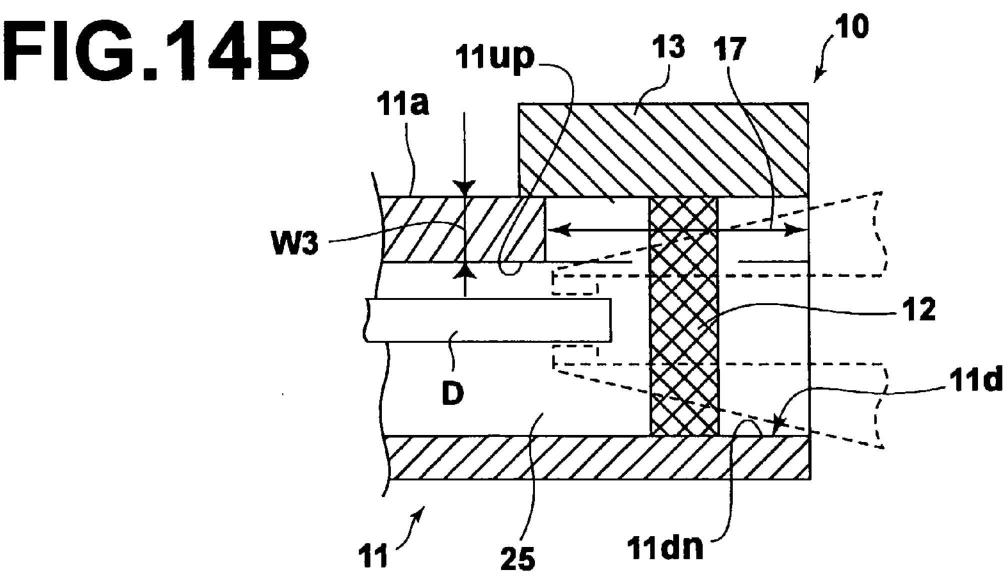
FIG. 14B is an enlarged sectional view showing the opening of the magnetic disk cartridge shown in FIGS. 12 and 13.

As clearly shown in FIGS. 14A and 14B, this embodiment is characterized in that the opening 11*d* is formed to extend from the side face 11*c* of the housing 11 to the main surface 11*a* of the housing 11. In the outer edge portion of the main surface 11*a*, there is formed a fan-shaped cutout 17 which communicates with the opening 11*d*. The protrusion 13 has a larger area than the cutout 17 and is disposed to cover the cutout 17.

While the cutout 17 in FIG. 14A is formed into the shape of a fan, the present invention is not limited to this shape. The shape of the cutout 17 is not important if the cutout 17 has a depth such that it does not interfere with a magnetic head holder (slider) which is inserted.

As evident in FIG. 14B, in the case where the opening 11*d* is provided only in the side face of the housing 11, the height of the opening 11*d* is from the inner bottom surface 11*dn* of the housing 11 to the inner top surface 11*up* of the housing 11. However, because the above-described cutout 17 is formed, the height of the opening 11*d* is from the inner bottom surface 11*dn* of the housing 11 to the bottom surface of the protrusion 13 and is increased by the thickness W3 of the upper plate of the housing 11. Therefore, a wide magnetic head holder (slider) with a plurality of magnetic heads can be inserted into the opening 11*d*. As a result, magnetic heads can be positioned over both sides of the magnetic disk D to perform high-density recording. That is, by widening the opening 11*d*, the magnetic disk cartridge 10 of a small size and large capacity can be provided.

In addition, by covering the cutout 17 with the protrusion 13, which acts as a reinforcing member, a reduction in the rigidity of the housing 11 due to formation of the opening 11*d* can be compensated for.

As shown in FIGS. 14A and 14B, the opening 11*d* is provided with the shutter 12. The shutter 12 is movably held by the inner bottom surface 11*dn* of the housing 11 and the protrusion 13. When the shutter 12 is opened, it is moved in the direction of arrow R1 along a rail RL formed in the inner top surface 11*up* of the housing 11.

The side face 13*a* of the protrusion 13 must have at least a length that is approximately the same as the length of the opening 11*d*, in order to cover the cutout 17. Because of this, the area of the protrusion 13 is increased. Therefore, even when the magnetic disk cartridge 10 is placed on a desk or floor with the main surface 11*a* downward, the magnetic disk cartridge 10 is stable.

Figure 15A:
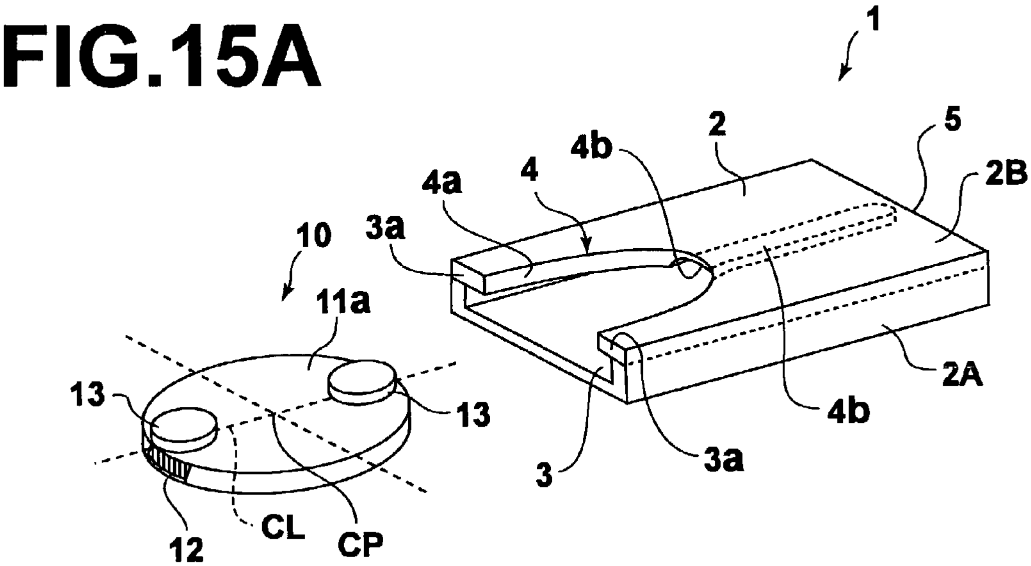
FIG. 15A is a perspective view showing the magnetic disk cartridge of FIGS. 12 and 13, and a disk drive in which the magnetic disk cartridge is loaded.
Figure 15B:
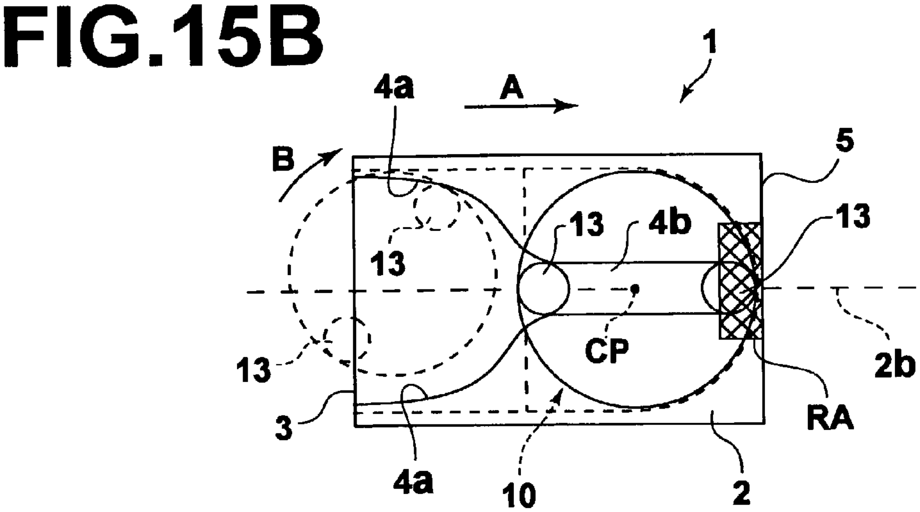
FIG. 15B is a plan view of the magnetic disk cartridge loaded in the disk drive, the upper plate of a housing being removed to show a guide portion.

FIGS. 15A and 15B correspond to FIGS. 9A and 9B, respectively. In FIG. 15, the second guide portion 4 of the disk drive 1 is widened to correspond to the increased area of the protrusion 13. Since the remaining construction is the same as that of FIG. 9, a detailed description will not be given to avoid redundancy. Even in the case where either protrusion 13 is first inserted into the disk drive 1, either opening 11*d* is reliably positioned in the above-described recording region RA, because the two openings 11*d* and the shutters 12 are disposed near the protrusions 13.

As described above, the cutout 17, which communicates with the opening 11*d*, is formed in the main surface 11*a* of the housing 11, and the opening 11*d* is formed between the bottom surface of the protrusion 13 and the inner bottom surface 11*dn* of the housing 11. In this way, the height of the opening 11*d* of the housing 11 can be increased. Therefore, a thick magnetic head holder (slider) with two magnetic heads, for example, can be inserted into the widened opening 11*d*. As a result, high-density recording can be performed on the magnetic disk cartridge 10 and therefore the magnetic disk cartridge 10 with a large recording capacity can be provided.

In the above-described embodiments, the protrusion 13 has a generally circular or elliptical planar shape. However, in the planar shape of the protrusion 13, the side face 13*a* has to correspond to the R-shape of the opening 11*d*, but the shape of a portion other than the side face 13*a* is not important. In addition, although the protrusions 13, 13 are provided on the main surface 11*a* of the housing 11, they may be provided on the bottom surface 11*b* of the housing 11.

In the above-described embodiments, the magnetic disk cartridge 10 has a plurality of protrusions on the main surface 11*a* of the generally disk-shaped housing 11. When the magnetic disk cartridge 10 is loaded in a disk drive, the cartridge 10 is positioned in a direction capable of recording and reproduction by cooperation of the protrusions of the cartridge 10 and the guide portion of the disk drive. However, in the embodiment depicted in FIGS. 16 and 17, the generally disk-shaped housing of a magnetic disk cartridge 10 has a guide groove 60. When the magnetic disk cartridge 10 is loaded in a disk drive, the cartridge 10 is positioned in a direction capable of recording and reproduction by cooperation of the guide groove 60 of the cartridge 10 and a protrusion 62 formed within the slot S of the disk drive.

Figure 16A:
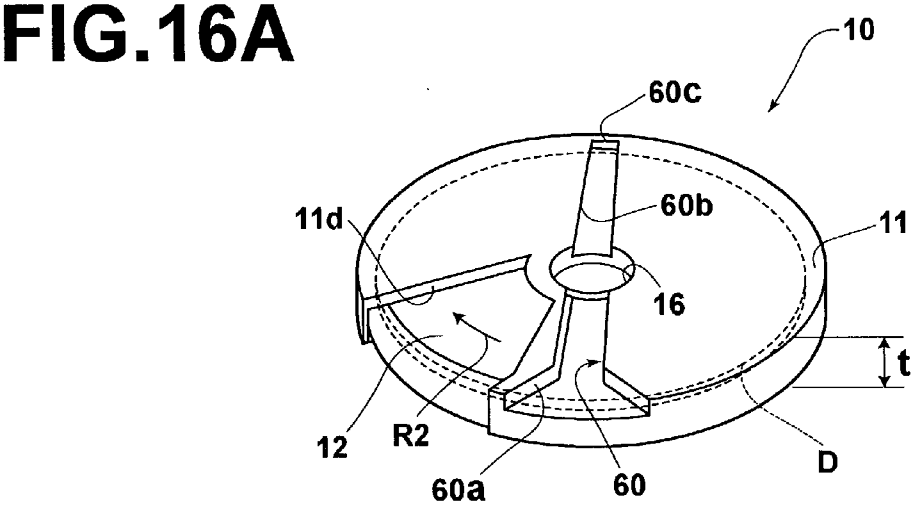
FIG. 16A is a perspective view showing a magnetic disk cartridge constructed in accordance with a sixth embodiment of the present invention.
Figure 16B:
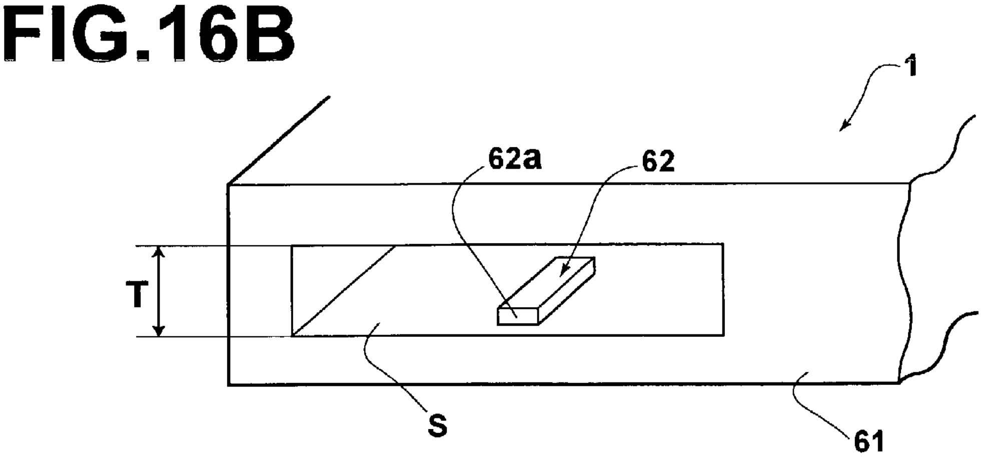
FIG. 16B is an enlarged perspective view of the slot of a disk drive in which the magnetic disk cartridge of FIG. 16A is loaded.
Figure 17:
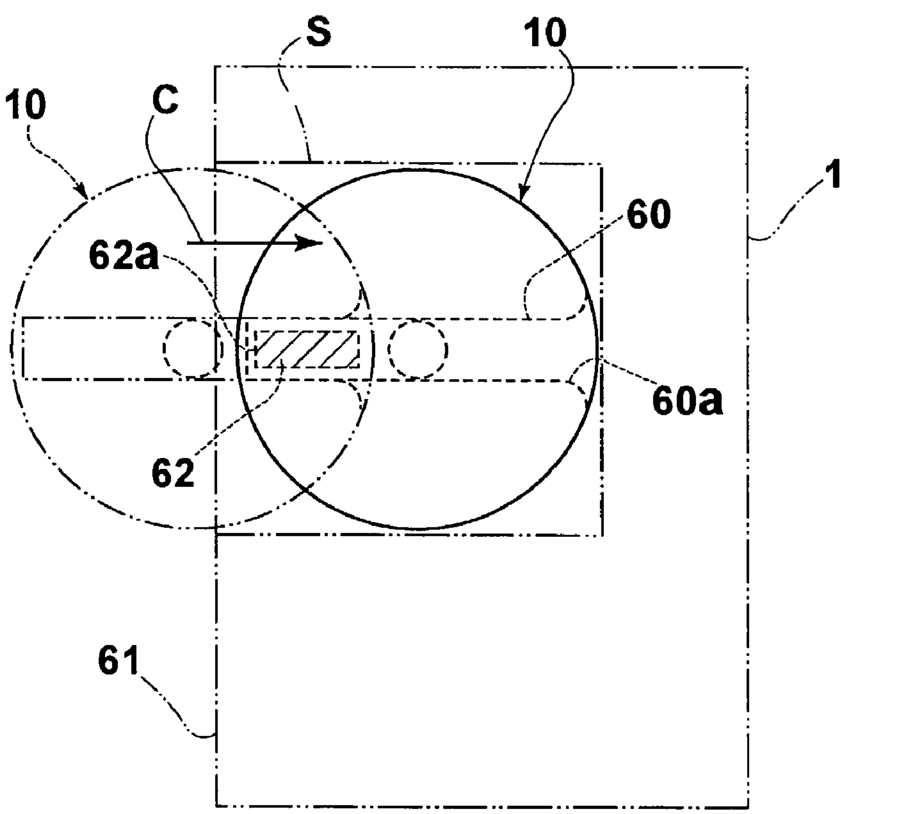
FIG. 17 is a plan view showing the state in which the magnetic disk cartridge of FIG. 16 is loaded in the disk drive.

That is, FIG. 16A shows a perspective view of the bottom of the magnetic disk cartridge 10 constructed in accordance with a sixth embodiment of the present invention. FIG. 16B shows an enlarged perspective view of the slot S of the disk drive 1 in which the magnetic disk cartridge of FIG. 16A is loaded. FIG. 17 shows the state in which the magnetic disk cartridge 10 is loaded in the disk drive 1.

The magnetic disk cartridge 10 has a generally disk-shaped housing 11, a magnetic disk D rotatably housed in the space of the housing 11, and a movable shutter 12 for covering the generally V-shaped openings 11*d* of the housing 11. The housing 11 is molded from resin, etc. The V-shaped openings 11*d* are formed in both sides of the housing 11 having a thickness of t. The V-shaped openings 11*d* are provided with a rotatable shutter 12 having a thickness thinner than the thickness t of the housing 11. That is, the shutter 12 is rotatable in the direction of arrow R2 along the circumference of the housing 11 between a closing position shown in FIG. 16A and an opening position at which the magnetic disk D is exposed.

The bottom surface of the housing 11 has a guide groove 60, which extends along the diameter of the housing 11. Near the opening 11*d*, the guide groove 60 consists of a broad portion 60*a* which widens toward the outer edge of the housing 11, and a guide portion 60 which extends linearly from the broad portion 60*a*. In the intermediate portion of the guide portion 60, that is, the center portion of the housing 11, there is provided a drive hole 16 into which the spindle (not shown) of the disk drive 1 for driving the magnetic disk D is inserted. The rearmost end of the guide groove 60 is terminated by the wall 60*c* of the housing 11. This wall 60*c* is not always required. The wall 60*c* may be formed integrally with the housing 11, or it may be a separate member.

The disk drive 1 into which the magnetic disk cartridge 10 is inserted has a slot S in the side face 61, as shown in FIG. 16B. The slot S has a width T that is slightly greater than the thickness t of the magnetic disk cartridge 10, and also has a depth that is slightly longer than the diameter of the housing 11. In the longitudinal central portion of the slot S along the side face 61, there is provided a protruding portion 62 that extends in the direction where the magnetic disk cartridge 10 is inserted. Near the inlet of the slot S, the protruding portion 62 has an end face 62*a* at a position recessed from the inlet by a distance slightly greater than the radial thickness of the wall 60*c* of the housing 11. The protruding portion 62 also has a length equal to the distance from the wall 60*c* to the drive hole 16 of the magnetic disk cartridge 10.

Next, the manner in which the magnetic disk cartridge 10 is inserted into the disk drive 1 will be described with reference to FIG. 17. The broad portion 60*a* of the guide groove 60 of the magnetic disk cartridge 10 is roughly aligned with the protruding portion (shaded portion) 62 of the disk drive 1 and is inserted into the slot S. As described above, the broad portion 60*a* widens toward the outer edge of the housing 11. Therefore, even if the guide groove 60 is slightly shifted laterally from the protruding portion 62, the guide groove 60 is positioned so that the protruding portion 62 is inserted into the guide groove 60. Furthermore, if the magnetic disk cartridge 10 is pushed into the slot S in the direction of arrow C, the magnetic disk cartridge 10 is inserted smoothly into the slot S while being guided by the protruding portion 62. The end face 62*a* of the protruding portion 62 may be a curved face so that it is easily inserted into the guide groove 60, or the end portion of the protruding portion 62 may be formed into the shape of a wedge.

If the protruding portion 62 becomes longer, the magnetic disk cartridge 10 can be more stably guided. If the magnetic disk cartridge 10 is inserted completely into the slot S, the end face 62*a* of the protruding portion 62 is positioned near the wall 60*c* of the magnetic disk cartridge 10. At this position, the shutter 12 is opened within the disk drive 1 by a shutter opening mechanism (not shown), and information can be recorded on or reproduced from the magnetic disk D by a magnetic head (not shown).

Thus, the magnetic disk cartridge 10 is guided and inserted by cooperation of the guide groove 60 and the protruding portion 62. In this case, the outer periphery of the magnetic disk cartridge 10 contacts the slot S at only a slight portion. In other words, since the magnetic disk cartridge 10 and the slot S are in a relationship of a circle and a tangential line, there is no possibility that the magnetic disk cartridge 10 and the slot will interfere with each other at the time of insertion. In addition, the magnetic disk cartridge 10 can be manufactured at low cost because it is structurally simple. For instance, if the magnetic disk cartridge 10 is used as a recording medium for digital cameras, information recorded on the magnetic disk cartridge 10 can be given away to a person.

In the case where a portion of the magnetic disk cartridge 10 other than the broad portion 60*a* is inserted into the slot S, the outer periphery of the housing 11 abuts the end face 62*a* of the protruding portion 62 and therefore incorrect insertion can be prevented. Since the guide groove 60 is formed only in one side of the magnetic disk cartridge 10, the top surface or bottom surface of the magnetic disk cartridge 10 can be confirmed before it is inserted. As a result, incorrect insertion can be prevented.

When the magnetic disk cartridge 10 is taken out from the disk drive 1, it can be ejected by a discharge mechanism (not shown) provided in the disk drive 1, as in the case of conventional floppy disks.

While the magnetic disk cartridge 10 with the guide groove 60 has been described, the present invention is not limited to this embodiment, but may be modified. For example, if the protruding portion 62 has a bore into which the above-described spindle is inserted, the protruding portion 62 can be extended over the diameter of the magnetic disk cartridge 10. In this case, the magnetic disk cartridge 10 can be prevented from being shifted in the longitudinal direction of the slot S at the time of insertion. Thus, the magnetic disk cartridge 10 can be more stably guided.

FIG. 18 shows a magnetic disk cartridge constructed in accordance with a seventh embodiment of the present invention. In this embodiment and subsequent embodiments, the same reference numerals will be applied to the same parts as the above-described embodiments and therefore a description thereof will not be given.

In a magnetic disk cartridge 110 shown in FIGS. 18A and 18B, the structure of a protrusion differs, for example, from that of the magnetic disk cartridge 10 shown in FIG. 4. That is, a single broad protrusion 113 is provided on the main surface 11*a* of a housing 11 along the outer circumference of the housing 11. The broad protrusion 113 has a arcuate face 113*a* so that users can hold it with the fingers.

FIG. 18C shows a disk drive 100 into which the magnetic disk cartridge 110 is inserted. The housing of the disk drive 100 has a guide portion 74, which is equipped with a arcuate face 74*a* corresponding to the shape of the arcuate face 113*a* of the protrusion 113 of the housing 11 of the magnetic disk cartridge 110.

In this case, when the magnetic disk cartridge 110 is loaded in the disk drive 100, the user holds the protrusion 113 with the fingers and inserts it into the opening 3 of the disk drive 100. When the protrusion 113 is not positioned within the guide portion 74, the magnetic disk cartridge 110 cannot be loaded in the disk drive 100. In this way, the magnetic disk cartridge 110 is inserted into the disk drive 100 in a direction capable of recording and reproduction.

That is, if the magnetic disk cartridge 110 is inserted into the disk drive 100 in the direction of arrow A by the user, the protrusion 113 is inserted into the guide portion 74, as shown in FIGS. 19A and 19B. The arcuate face 113*a* of the protrusion 113 is engaged with the arcuate face 74*a* of the guide portion 74, whereby the movement of the magnetic disk cartridge 110 in the direction of arrow A is regulated. In this way, the magnetic disk cartridge 110 is held at a position capable of recording and reproduction with respect to the disk drive 100. Therefore, even in the case where the magnetic disk cartridge 110 is formed into the shape of a disk, the magnetic disk cartridge 110 can be reliably positioned with respect to the disk drive 100 in a direction capable of recording and reproduction. When the magnetic disk cartridge 110 is loaded in the disk drive 100, the arcuate face 113*a* of the protrusion 113 is engaged with the arcuate face 74*a* of the guide portion 74, and consequently, there is no possibility that the magnetic disk cartridge 110 will be shifted.

Figure 20A:
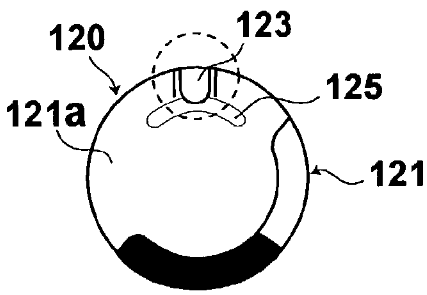
FIG. 20A is a plan view showing a magnetic disk cartridge constructed in accordance with an eighth embodiment of the present invention.
Figure 20C:
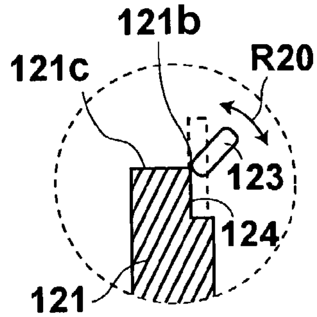
FIG. 20C is a sectional view of the magnetic disk cartridge shown in FIG. 20A.
Figure 20B:
FIG. 20B is a side view of the magnetic disk cartridge shown in FIG. 20A.

FIG. 20A shows a plan view of a magnetic disk cartridge 120 constructed in accordance with an eighth embodiment of the present invention. FIG. 20B shows a side view of the magnetic disk cartridge 120 shown in FIG. 20A. FIG. 20C shows a sectional view of the magnetic disk cartridge 120 shown in FIG. 20A.

The magnetic disk cartridge 120 has a protruding piece 123 at the outer edge of the circular main surface 121a. The protruding piece 123 is rotatable through 180 degrees in the direction of arrow R20 shown in FIG. 20C. The main surface 121a has a housing groove 124 for housing the protruding piece 123. For example, when the magnetic disk cartridge 120 is put in a pocket and carried, the protruding piece 123 is housed in the housing groove 124. In this way, the protruding piece 123 can be prevented from being disengaged from the housing 121.

On the other hand, when the magnetic disk cartridge 120 is inserted into the disk drive, the protruding piece 123 is pulled up 180 degrees and protruded from the side face 121c of the housing 121. In this way, the user can recognize the inserting direction of the magnetic disk cartridge 120 with the sense of touch by the protruding piece 123. In addition, when the magnetic disk cartridge 120 is taken out from the disk drive, the user can also pull the protruding piece 123 out of the housing groove 124 with the fingers.

Figure 21:
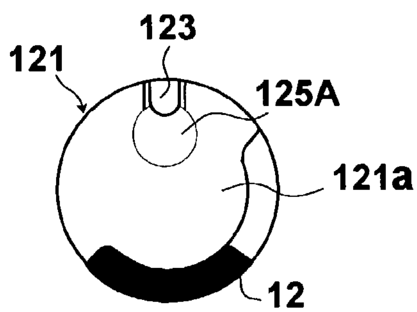
FIG. 21 is a plan view showing a first modification of the magnetic disk cartridge shown in FIG. 20.

The main surface 121a of the housing 121 has an arcuate recess 125 in the vicinity of the protruding piece 123. With this arcuate recess 125, the user can also recognize the inserting direction of the magnetic disk cartridge 120 by the sense of touch and can easily hold the magnetic disk cartridge 120. Note that the main surface 121a may have a generally circular recess 125A such as that shown in FIG. 21.

Figure 22A:
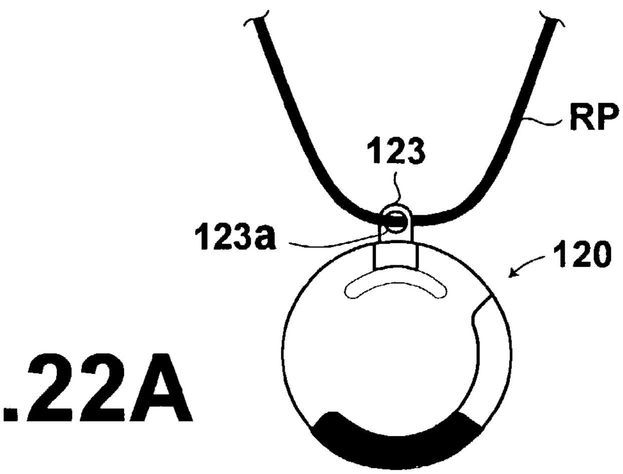
FIG. 22A is a perspective view showing a second modification of the magnetic disk cartridge shown in FIG. 20.
Figure 22B:
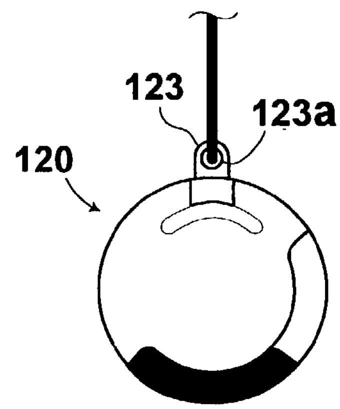
FIG. 22B is a plan view of FIG. 22A.
Figure 22C:
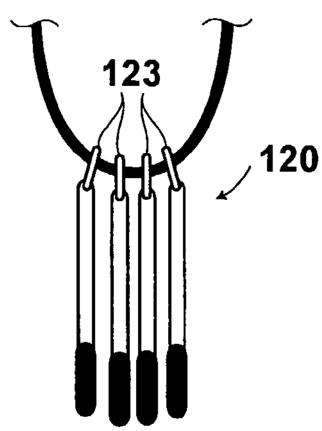
FIG. 22C is a side view of FIG. 22B.

Furthermore, the protruding piece 123 may have a bore 123a such as that shown in FIG. 22A. If a string RP is passed through the bore 123a, the magnetic disk cartridge 120 can be hung round the user's neck and carried. As shown in FIGS. 22B and 22C, if a string RP is passed through the bores 123a of a plurality of the magnetic disk cartridges 120, they can be carried. As a result, the convenience can be enhanced.

Figure 23A:
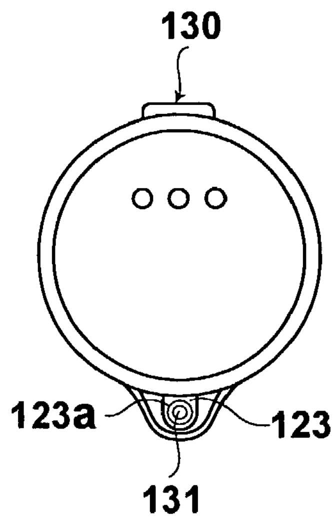
FIG. 23A is a plan view showing the state in which the magnetic disk cartridges of FIG. 22 are housed within a case.
Figure 23B:
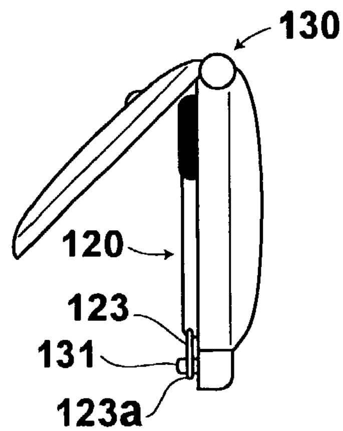
FIG. 23B is a side view showing the state in which the magnetic disk cartridges of FIG. 22 are housed within the case.
Figure 23C:
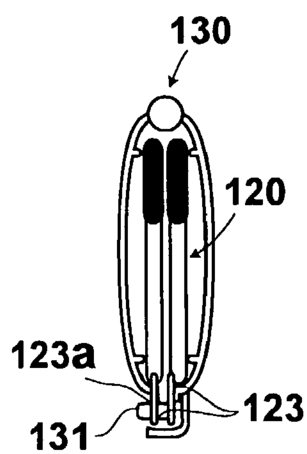
FIG. 23C is a sectional view showing the state in which the magnetic disk cartridges of FIG. 22 are housed within the case.

As shown in FIGS. 23A to 23C, in the case where magnetic disk cartridges 120 are put in a housing case 130 and carried, a pin 131 in the housing case 130 is passed through the bores 123a of the protruding pieces 123 of the magnetic disk cartridges 120. In this way, the housed magnetic disk cartridges 120 can be prevented from being moved within the housing case 130. Therefore, the shock resistance of the housing case 130 is enhanced. The housing case 130 has a cartridge housing portion and a lid rotatably attached to the cartridge housing portion. The above-described protruding piece 123 may be attached to the main surface 121a or side face of the housing 120.

FIGS. 24 to 30 illustrate magnetic disk cartridges and disk drives with various shapes and structures.

Figure 24A:
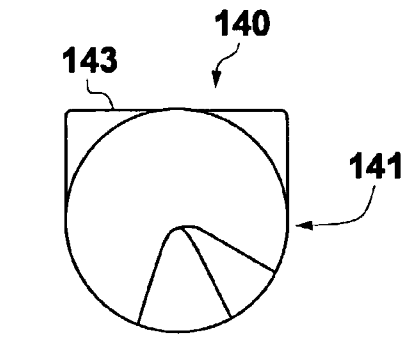
FIG. 24A is a plan view showing a magnetic disk cartridge constructed in accordance with a ninth embodiment of the present invention.
Figure 24B:
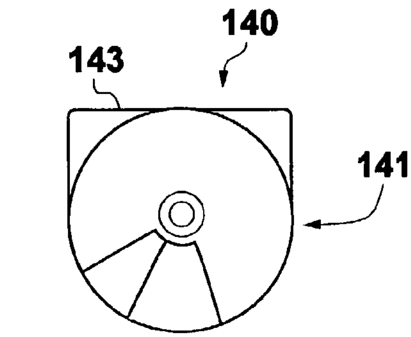
FIG. 24B is a bottom view of the magnetic disk cartridge shown in FIG. 24A.
Figure 24C:
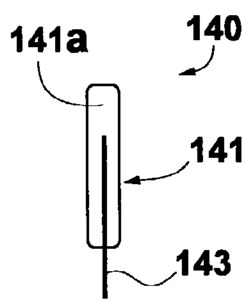
FIG. 24C is a side view of the magnetic disk cartridge shown in FIG. 24A.

FIGS. 24A to 24C show a magnetic disk cartridge 140 constructed in accordance with a ninth embodiment of the present invention. The magnetic disk cartridge 140 is equipped with a film-shaped protruding piece 143, which protrudes from the side face 141a of a housing 141. When the magnetic disk cartridge 140 is taken out from a disk drive, a user can pull it out of the disk drive while holding the protruding piece 143.

Figure 25A:
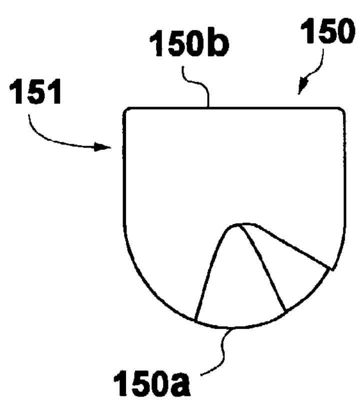
FIG. 25A is a plan view showing a magnetic disk cartridge constructed in accordance with a tenth embodiment of the present invention.
Figure 25B:
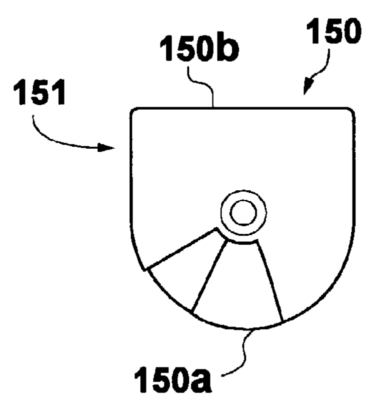
FIG. 25B is a bottom view of the magnetic disk cartridge shown in FIG. 25A.

FIGS. 25A and 25B show a magnetic disk cartridge 150 constructed in accordance with a tenth embodiment of the present invention. The housing 151 of the magnetic disk cartridge 150 has a front curved edge 150a that is inserted into a disk drive, and a rear straight edge 150b.

Figures 26A, 26B, 26C:
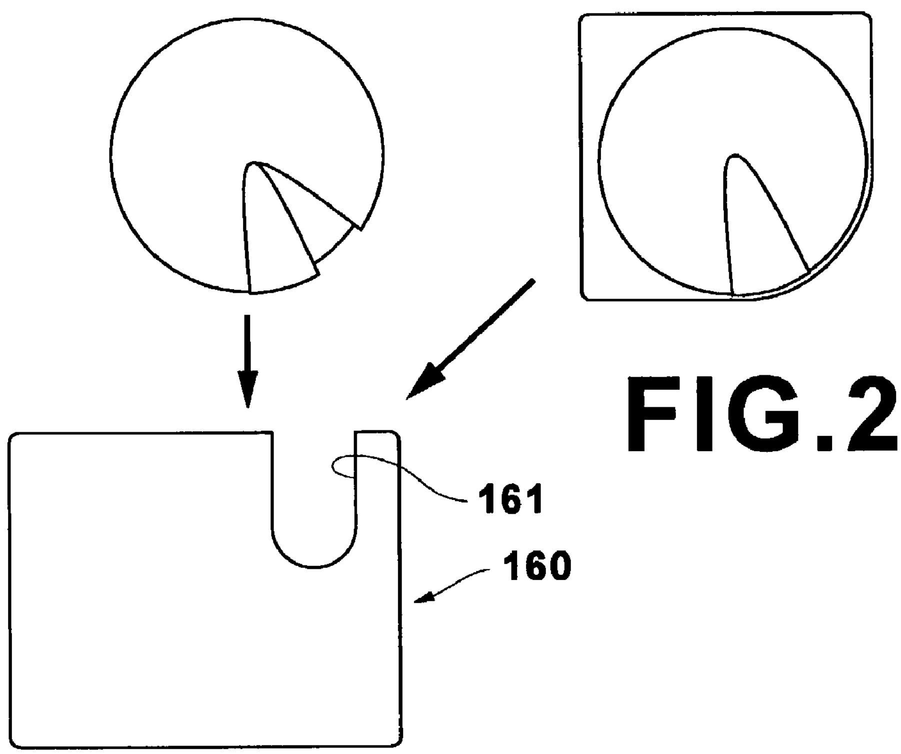
FIG. 26A is a plan view showing a magnetic disk cartridge constructed in accordance with an eleventh embodiment of the present invention.
FIG. 26B is a plan view showing a modification of the magnetic disk cartridge of FIG. 26A.
FIG. 26C is a plan view showing a disk drive in which the magnetic disk cartridge of FIG. 26A or 26B is loaded.
Figure 27A:
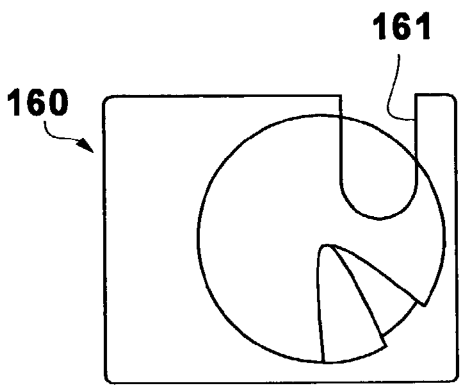
FIGS. 27A and 27B are plan views showing the state in which the magnetic disk cartridge of FIG. 26A is loaded in the disk drive of FIG. 26C.
Figure 27C:
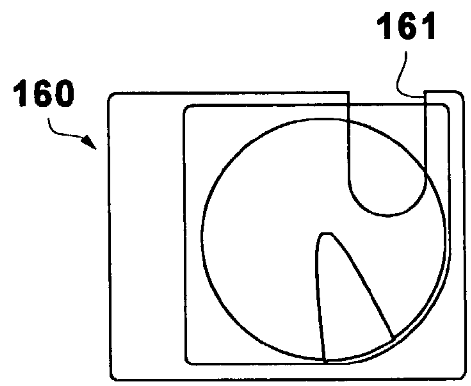
FIGS. 27C and 27D are plan views showing the state in which the magnetic disk cartridge of FIG. 26B is loaded in the disk drive of FIG. 26C.
Figure 27B:
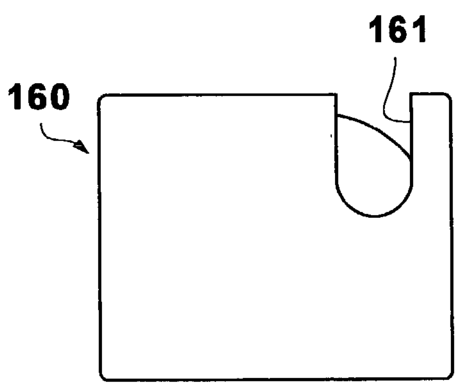
Figure 27D:
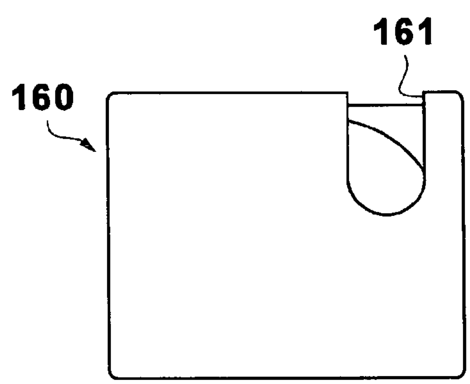
Figure 28A:
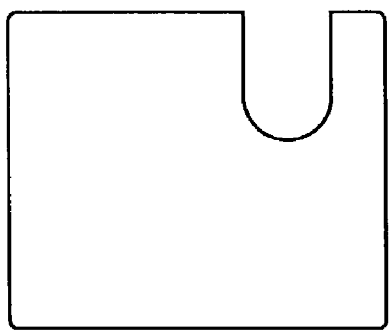
FIGS. 28A to 28D are plan views of disk drives with different shapes.
Figure 28B:
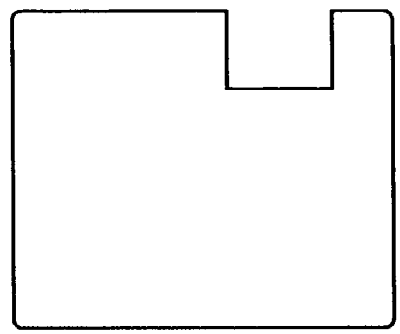
Figure 28C:
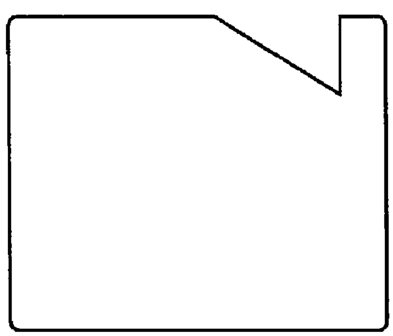
Figure 28D:
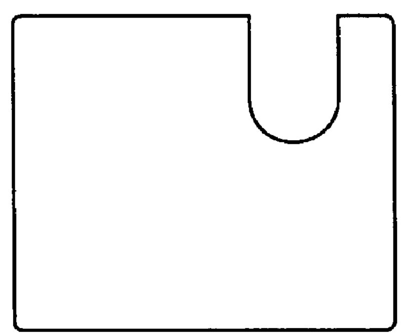

If a magnetic disk cartridge shown in FIG. 26A or 26B is inserted into a disk drive 160 shown in FIG. 26C, a portion of the magnetic disk cartridge is exposed through the cutout 161 of the disk drive 160, as shown in FIG. 27. Therefore, a user can hold the magnetic disk cartridge through the cutout 161 with fingers and take it out of the disk drive 160.

FIGS. 28A to 28D show disk drives equipped with housings that have various cutouts. The main surface of each housing may have an arrow indicative of a direction where the disk drive with a magnetic disk cartridge loaded therein is inserted into the slot of electronic equipment.

Figures 29A, 29B, 29C:
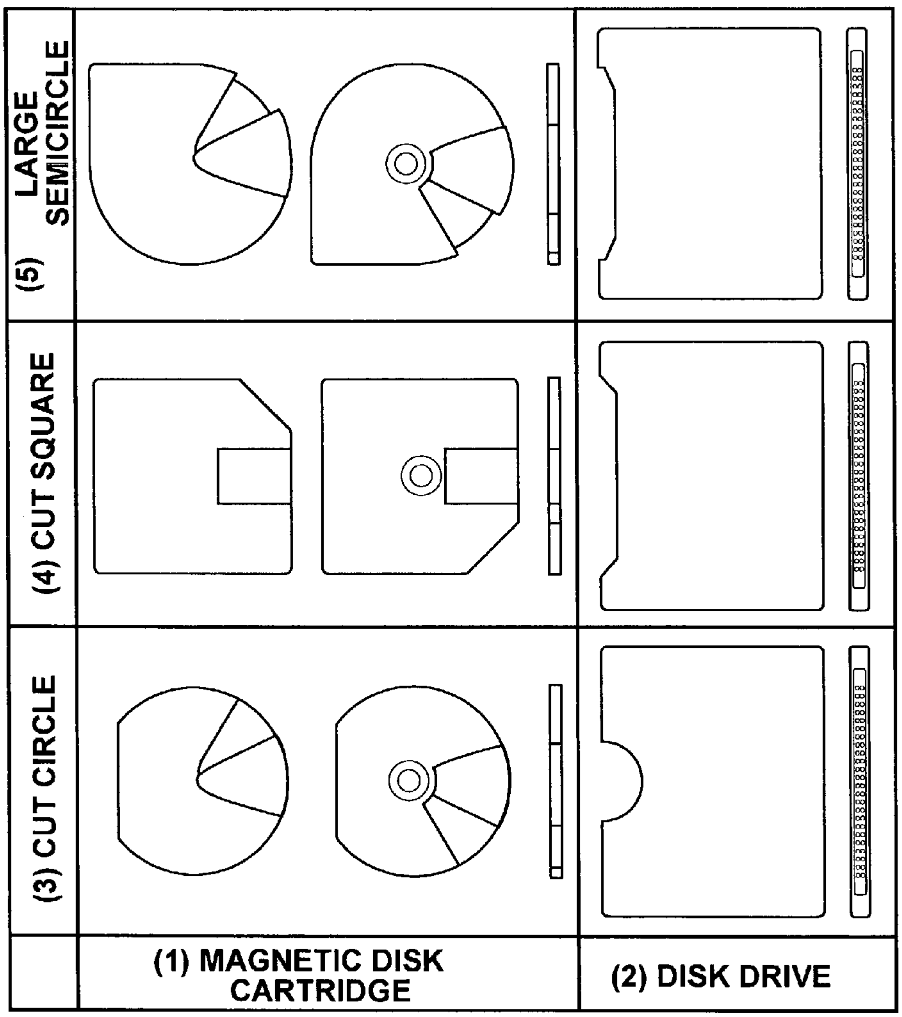
FIGS. 29A to 29C are diagrams showing a list of shapes of magnetic cartridges and disk drives.
Figures 30A, 30B, 30C, 30D:
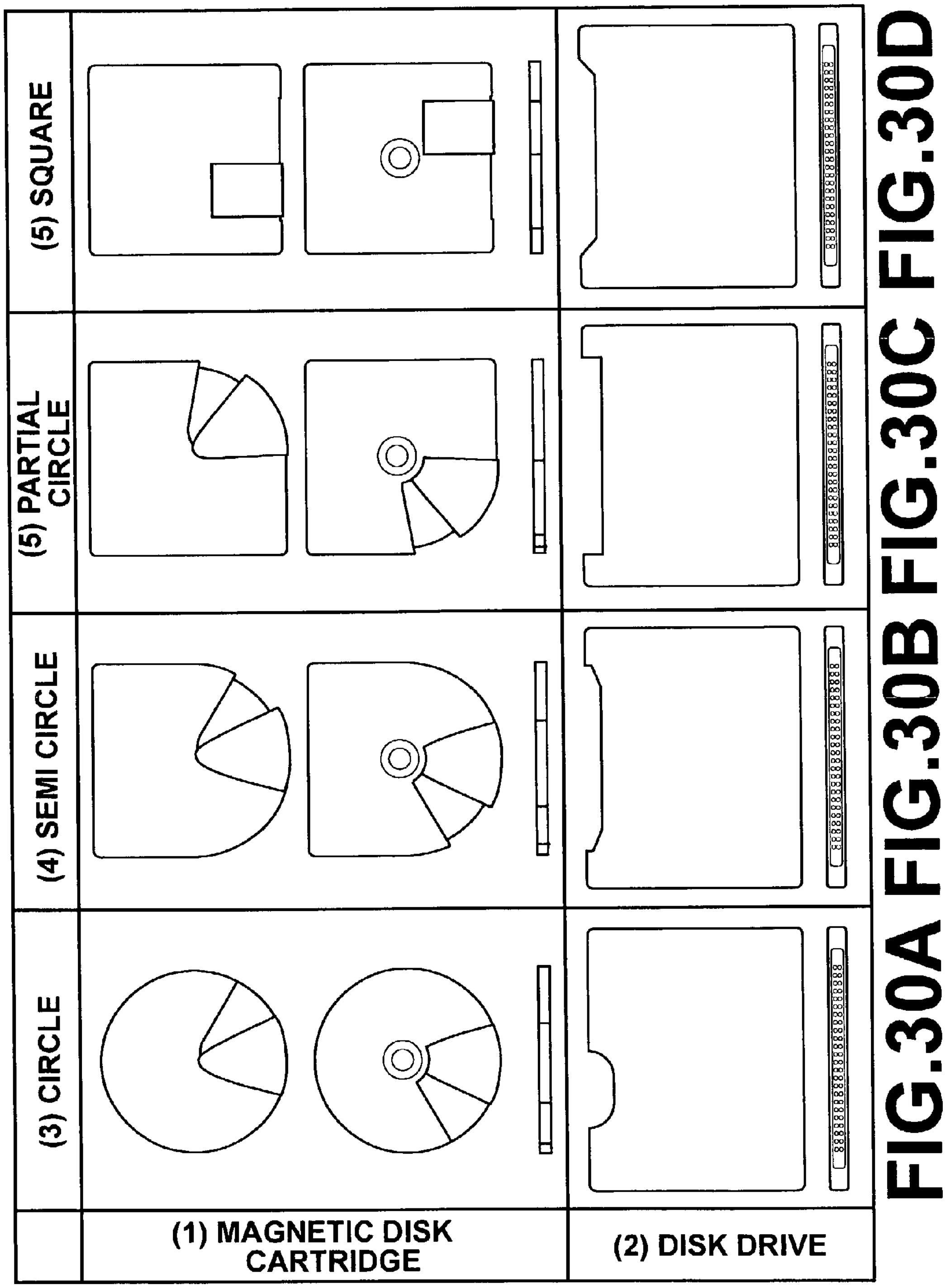
FIGS. 30A to 30D are diagrams showing a list of shapes of magnetic cartridges and disk drives.
Figure 31A:
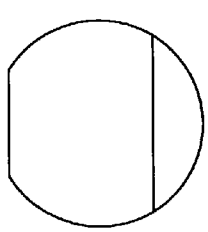
FIGS. 31A to 31I are plan views showing various shapes of magnetic disk cartridge housings.
Figure 31B:
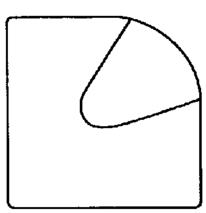
Figure 31C:
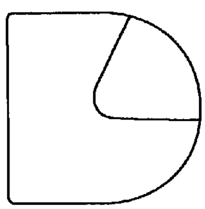
Figure 31D:
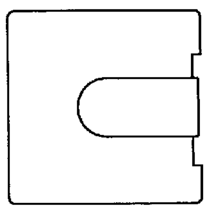
Figure 31E:
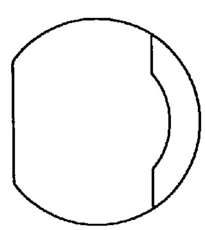
Figure 31F:
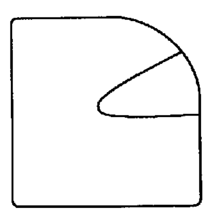
Figure 31G:
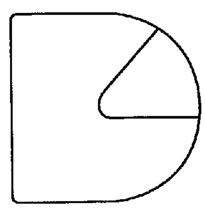
Figure 31H:
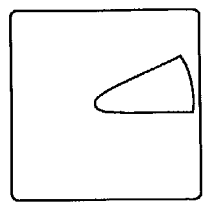
Figure 31I:
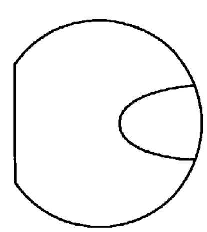
Figure 32A:
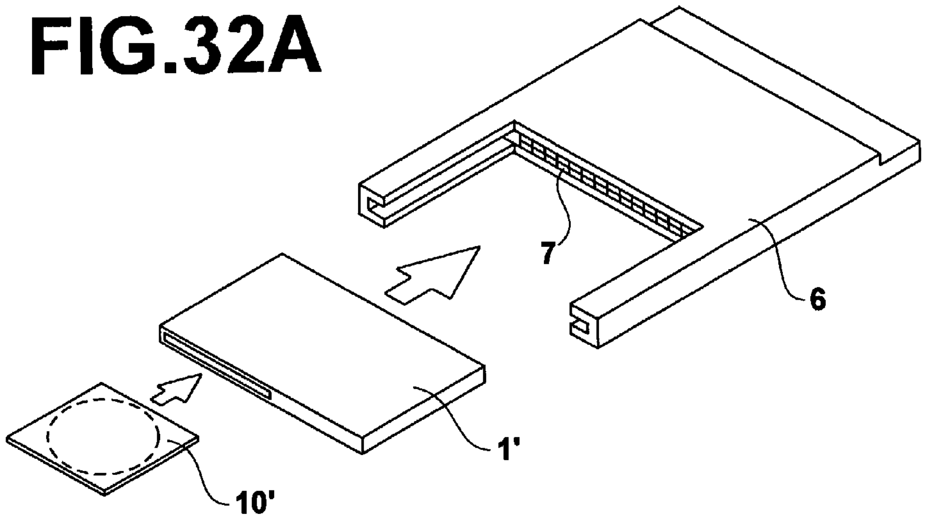
FIG. 32A is a perspective view showing a magnetic disk cartridge on which the present invention is based, and a disk drive for a PC in which the disk cartridge is loaded.
Figure 32B:
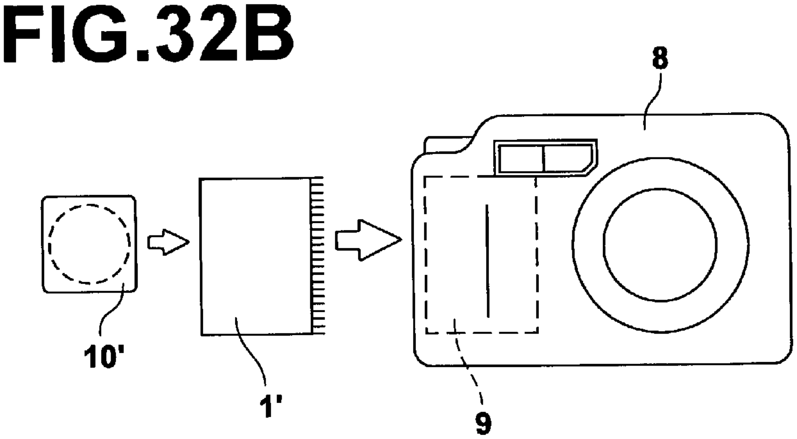
FIG. 32B is a perspective view showing the magnetic disk cartridge on which the present invention is based, and a disk drive for a digital camera in which the disk cartridge is loaded.

FIGS. 29 and 30 show the shape of the housing of each of various magnetic disk cartridges, and the shape of a corresponding disk drive into which the magnetic disk cartridge is inserted.

FIGS. 31A to 31I show various shapes of magnetic disk cartridge housings.

While the present invention has been described with reference to the preferred embodiments thereof, the invention is not to be limited to the details given herein, but may be modified within the scope of the invention hereinafter claimed.

What is claimed is:

1. A magnetic disk cartridge for use in a disk drive having both a slot and a guide portion, comprising:

a generally disk-shaped housing in which a magnetic disk is rotatably housed; and protrusions, formed on a main surface of said housing, for positioning said magnetic disk cartridge in a direction capable of recording and reproduction in cooperation with the guide portion of said disk drive when said magnetic disk cartridge is loaded in said disk drive, wherein said housing comprises, at least one opening into which a magnetic head of said disk drive is inserted; and at least one shutter for opening or closing said opening, and wherein said protrusions comprise, at least two protrusions disposed along a straight line passing through the center of the main surface of said housing, and across said center.

2. The magnetic disk cartridge as set forth in claim 1 wherein said at least two protrusions comprise:

first and second protrusions disposed along the straight line passing through the center of the main surface of said housing, and across said center; wherein the distance of said first protrusion from said center is different from that of said second protrusion.

3. The magnetic disk cartridge as set forth in claim 2, wherein the height of said first protrusion from the main surface of said housing is approximately equal to that of said second protrusion.

4. The magnetic disk cartridge as set forth in claim 2, wherein the height of said first protrusion from the main surface of said housing is different from that of said second protrusion.

5. The magnetic disk cartridge as set forth in claim 4, wherein said first protrusion is disposed at a position close to said center;

said second protrusion is disposed at a position away from said center; and the height of said first protrusion is lower than that of said second protrusion.

6. The magnetic disk cartridge as set forth in claim 1, wherein said at least one opening comprises a plurality of openings, each having said shutter; and said protrusions locate any one of said plurality of openings at a position capable of recording and reproduction in cooperation with the guide portion of said disk drive when said magnetic disk cartridge is loaded in said disk drive.

7. The magnetic disk cartridge as set forth in claim 1, wherein said at least one opening comprises a pair of openings, and said housing has a side face provided with said pair of openings, said openings having said at least one shutter and are symmetrical with respect to the center of the main surface of said housing;

said housing also has cutouts which communicate with said openings and are formed in said main surface; and said protrusions are provided to cover said cutouts.

8. The magnetic disk cartridge as set forth in claim 1, wherein said magnetic disk comprises a high density magnetic recording medium employing barium ferrite powder.

9. A magnetic disk cartridge for use in a disk drive having both a slot and a guide portion, comprising:

a generally disk-shaped housing in which a magnetic disk is rotatably housed; and protrusions, formed on a main surface of said housing, for positioning said magnetic disk cartridge in a direction capable of recording and reproduction in cooperation with the guide portion of said disk drive when said magnetic disk cartridge is loaded in said disk drive, wherein said housing is equipped with a plurality of openings each having said shutter, and said protrusions locate any one of said plurality of openings at a position capable of recording and reproduction in cooperation with the guide portion of said disk drive when said magnetic disk cartridge is loaded in said disk drive.

10. A magnetic disk cartridge for use in a disk drive having both a slot and a guide portion, comprising:

a generally disk-shaped housing in which a magnetic disk is rotatably housed; and protrusions, formed on a main surface of said housing, for positioning said magnetic disk cartridge in a direction capable of recording and reproduction in cooperation with the guide portion of said disk drive when said magnetic disk cartridge is loaded in said disk drive, wherein said housing has a side face provided with a pair of openings, said openings having a shutter and are symmetrical with respect to the center of the main surface of said housing, said housing also has cutouts which communicate with said openings and are formed in said main surface, and said protrusions are provided to cover said cutouts.

* * * * *